(12) United States Patent
Erlebach

(10) Patent No.: US 8,850,633 B2
(45) Date of Patent: Oct. 7, 2014

(54) ELONGATED SHOWER DRAIN AND SHOWER DOOR ASSEMBLY

(76) Inventor: Josef Erlebach, Silverthorne, CO (US)

( * ) Notice: Subject to any disclaimer, the term of this patent is extended or adjusted under 35 U.S.C. 154(b) by 955 days.

(21) Appl. No.: 12/881,164

(22) Filed: Sep. 13, 2010

(65) Prior Publication Data

US 2011/0061161 A1   Mar. 17, 2011

Related U.S. Application Data

(63) Continuation-in-part of application No. 12/345,485, filed on Dec. 29, 2008, now Pat. No. 8,239,974.

(60) Provisional application No. 61/241,875, filed on Sep. 12, 2009.

(51) Int. Cl.
*E03C 1/12* (2006.01)

(52) U.S. Cl.
USPC .............................................. 4/679

(58) Field of Classification Search
USPC ..................................... 4/613, 679
See application file for complete search history.

(56) References Cited

U.S. PATENT DOCUMENTS

| | | | | |
|---|---|---|---|---|
| 6,027,283 | A * | 2/2000 | Schweinberg et al. | 405/42 |
| 6,612,780 | B2 * | 9/2003 | Dahowski et al. | 405/118 |
| 7,967,523 | B2 * | 6/2011 | Hetzler et al. | 404/4 |
| 2011/0067175 | A1 * | 3/2011 | Steylaerts et al. | 4/679 |
| 2011/0088161 | A1 * | 4/2011 | Stimpson | 4/613 |
| 2011/0162137 | A1 * | 7/2011 | Kik et al. | 4/613 |

FOREIGN PATENT DOCUMENTS

BE   2009/0583   * 9/2009

* cited by examiner

*Primary Examiner* — Huyen Le
(74) *Attorney, Agent, or Firm* — Leyendecker & Lemire, LLC

(57) ABSTRACT

Elongated drain assemblies suitable for use in tiled shower stalls are described. Because the elongated drain is typically located at one edge of the shower stall proximate a stall wall and extends substantially the entire length of the wall, the installation of the associated shower pan is made much simpler. Specifically, the pan need only be sloped substantially in a single direction instead of four towards a prior art circular drain located at the center of a stall. The time and cost of creating a pan having a single slope is reduced over a more complex multi-sloped pan. Several different means for adjusting the height of the drain assemblies' top surfaces relative to the height of the tile floor are provided to adjust for tile floors of differing thicknesses. Various drain grates including a V-shaped drain grate and various spacers including an adjustable spacer are disclosed. Additionally a combination elongated drain assembly and shower door assembly is described.

15 Claims, 33 Drawing Sheets

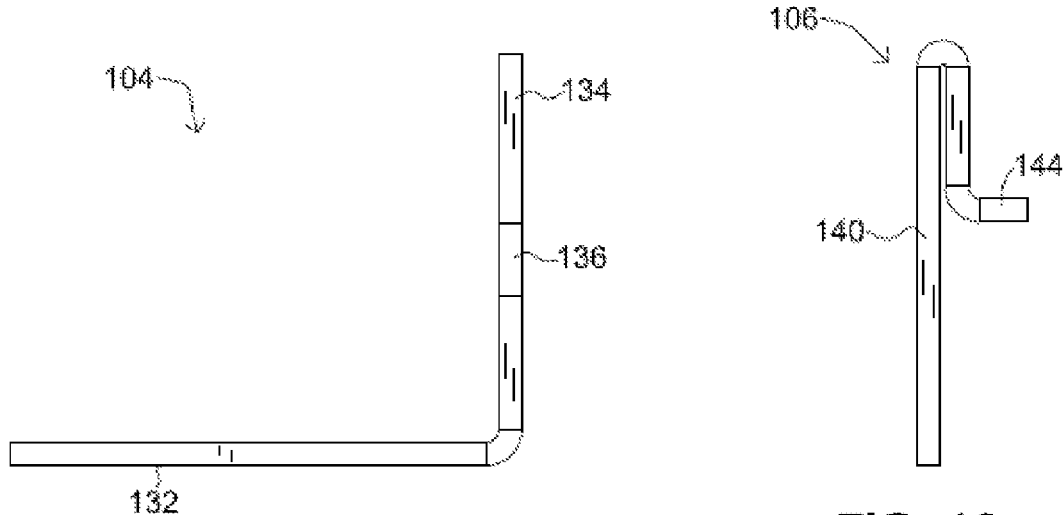
FIG. 8
FIG. 10
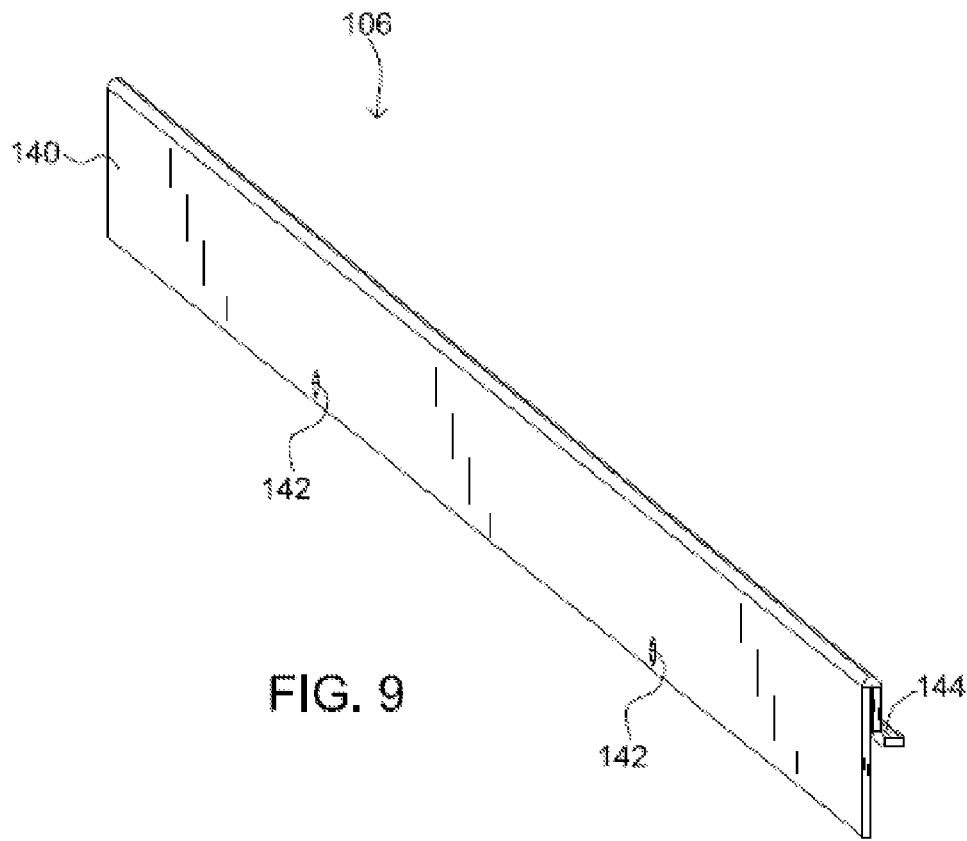
FIG. 9

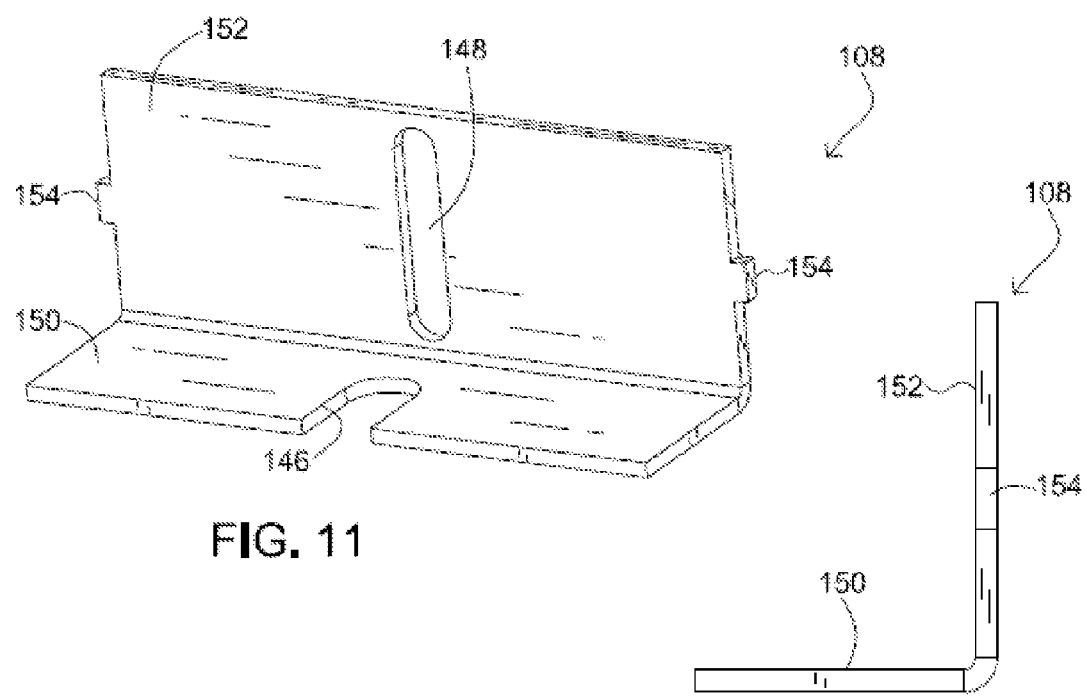
FIG. 11
FIG. 12
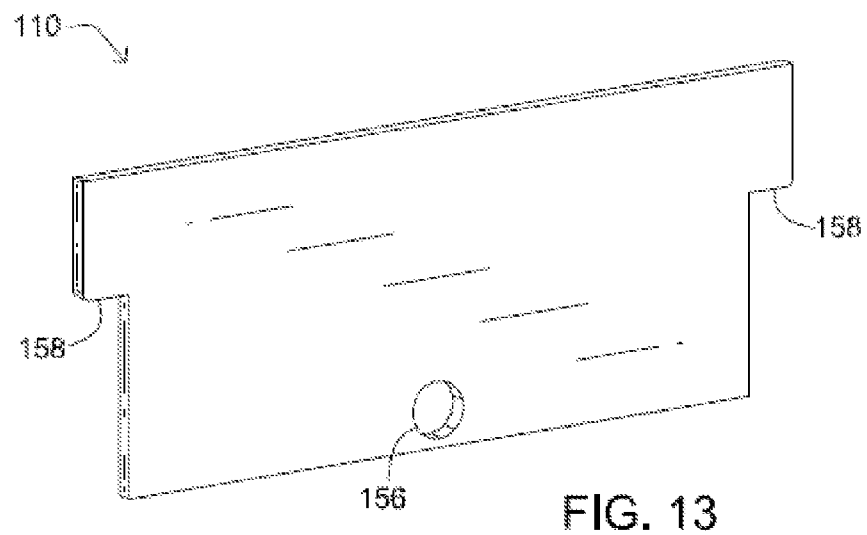
FIG. 13

ELONGATED SHOWER DRAIN AND SHOWER DOOR ASSEMBLY

CROSS-REFERENCE TO RELATED APPLICATIONS

This application is a continuation-in-part of and claims priority to U.S. Nonprovisional patent application Ser. No. 12/345,485 filed Dec. 29, 2008, the full disclosure of which is incorporated herein by reference. The aforementioned nonprovisional patent application has the title "ELONGATED SHOWER DRAIN," and has the same named inventor as the present application. Additionally, this application is a nonprovisional of and claims priority to U.S. Provisional Patent Application No. 61/241,875 filed Sep. 12, 2009, the full disclosure of which is incorporated herein by reference. The aforementioned provisional patent application has the title "Elongated Shower Drain including Variation for Use with a Shower Door," and has the same named inventor as the present application.

FIELD OF THE INVENTION

The present invention pertains to floor drains such as those typically found in residential and commercial showers.

BACKGROUND

Bathrooms and showers stalls are often provided with tiled floors especially in higher end homes. In shower stalls, a drain is typically placed in or near the center of the stall and the floor is sloped slightly towards the center drain to ensure the water runs into the drain as opposed to sitting on the floor or seeping into the structure at the intersection of the floor with the stall walls.

As can be appreciated, tiling a floor that slopes in different directions towards the center of the stall can be difficult and time consuming especially if localized reversed slopes and other slope anomalies are to be avoided. The problem can be especially acute when large-sized tiles (6"×6", 8"×8", 12"×12" and larger) are utilized. Often it is necessary to cut the tiles on a diagonal where two slopes running in different directions intersect.

Elongated drains that are located a one edge of a stall thereby facilitating a floor that slopes primarily in a single direction are known. However, they tend to be best suited for commercial or industrial applications and often require installation by skilled craftsmen to ensure the drain's top surface is effectively even or level with that of the surrounding floor. For instance in many commercial applications like in communal showers, elongated drains are molded into the concrete pans of the expansive floors and are covered with perforated grates. The sides and bottom surfaces of these molded-in drains are then often covered in tiles. Such exacting and time consuming construction make these drains economically unsuitable for use in most residential structures.

Cost-effective prefabricated elongated drains suitable for use in residential structures are just not readily available in the marketplace. Elongated drain assemblies that have been proposed are often not amenable for use by do it yourselfers, who are mechanically astute but lack the experience of tradesmen. Furthermore, prior art assemblies even if amenable for installation by tradesmen are either or both prohibitively expensive and prohibitively expensive to install. These cost considerations ameliorate any potential cost advantages of installing a titled shower with a pan that is sloped in a single direction instead of multiple directions.

BRIEF DESCRIPTION OF THE DRAWINGS

FIG. 8 is end view of the lower long rail of FIG. 6 according to one embodiment of the present invention.

FIG. 9 is an isometric view of the upper long rail according to one embodiment of the present invention.

FIG. 10 is an end view of the upper long rail of FIG. 9 according to one embodiment of the present invention.

FIG. 11 is an isometric view of the lower short rail according to one embodiment of the present invention.

FIG. 12 is an end view of the lower short rail of FIG. 11 according to one embodiment of the present invention.

FIG. 13 is an isometric view of the upper short rail according to one embodiment of the present invention.

DETAILED DESCRIPTION

Figure 1:
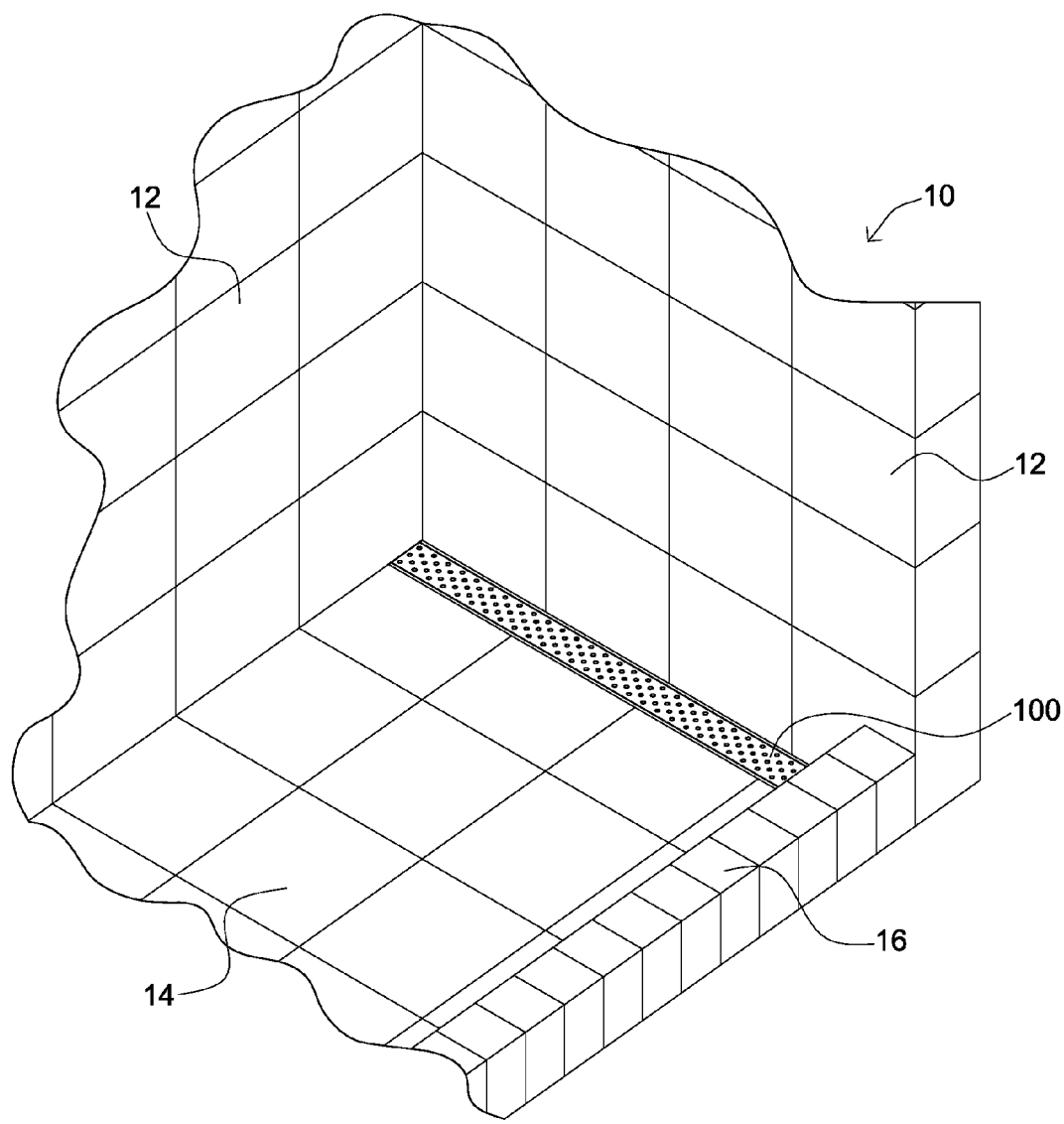
FIG. 1 is an isometric view of a shower stall having an elongated drain installed therein according to one embodiment of the present invention.

Embodiments of the present invention comprise elongated drain assemblies suited for use in residential construction. Because the elongated drain is typically located at one edge of the shower stall proximate a stall wall and extends substantially the entire length of the wall, the installation of the associated shower pan is made much simpler. Specifically, the pan need only be sloped substantially in a single direction instead of four towards a circular drain located at the center of a stall. The time and cost of creating a pan having a single slope is reduced over a more complex multi-sloped pan.

The use of an elongated drain is especially advantageous in shower stalls wherein the floor is finished with larger tiles (6"×6" to 24"×24"). With traditional center drain floors, the use of large tiles is often not possible depending on how the pan is sloped. Even when properly sloped; the tile layer typically has to cut a large number of the tiles on the diagonal to account for the intersection of differently sloped portions of the pan. As can be appreciated the increased complexity of the tiling laying job increases, often substantially, the cost of tiling the shower pan. However, since the pan slopes in substantially a single direction when an elongated drain is used, no special or complex tile work is required; thereby, substantially decreasing the cost of laying the tile.

One of the primary considerations in laying a shower stall pan and subsequently the tile over the pan is ensuring that the top of the drain is essentially level with the immediately adjacent tile. If the top of the drain is depressed too far, an edge is created in which a user of the shower could stub his/her toe or otherwise injure his/her foot. If the top of the drain is too high, a puddle of standing water might fill a portion of the pan. The water may not evaporate between shower uses and as such promote the growth of mold and bacteria.

The traditional round drain typically includes a top portion that includes the top of the drain including a grate and a bottom portion that attaches to the drain pipe. The top portion is typically threadably received into the bottom portion such that by rotating the top portion its relative height can be adjusted upwardly and downwardly. The skilled shower pan fabricator and tile layer know within a small margin of error the relative height built up from the subfloor for the pan and the tiles including the necessary thickness of thin-set mortar layers.

Prior art elongated drains do not have a convenient mechanism or means to adjust the relative heights of the top of the grate and as such the installer must design the pan and tile thicknesses to accommodate the drain rather than the drain accommodating the particular combination of pan and tile. This can be especially problematic when tiles of a thickness other than that for which the prior art drain is designed are used. For instance, a drain may be designed to accommodate a pan of standard thickness in combination with a predetermined thin-set thickness and a predetermined standard tile thickness. If the installer desires to use thinner tile or thicker tile, such as is common with some natural stones, the grate will fall rise above or fall below the top of the grate potentially resulting in similar problems as discussed above concerning circular drains in addition to detracting from the aesthetics of the shower stall floor.

One embodiment of the present invention provides one means to adjust the height, or spacing, of the top of the drain grate relative to a base unit prior to the installation of tile by rising or lowering side and end plates and securing them in place. The means of another embodiment permits the height of the grate to be adjusted through the use of grate attachment spacers after the pan and the tile have been installed.

The size of shower stalls can vary dramatically. However, for maximum effectiveness the elongated drain should span most of one side of the shower stall. If the drain is shorter than the length of the side, the tile on either side of the drains ends will have to be sloped towards the drain thereby increasing the complexity of the installation somewhat. Certain embodiments are produced in standard lengths that correspond to common shower stall wall lengths. When these embodiments are utilized the length of the wall must be carefully determined often at a framing stage of construction.

Often there isn't an opportunity to design a shower stall around the drain. For instance, the shower stall's framing may be substantially complete before the installation of an elongated drain is considered. In other circumstances, the installation of the elongated drain may be part of a remodel using existing framing. In such circumstances, standard length drains might not span the entire length of a side and as such require sloping of the pan and tiles proximate one or both ends of the drain.

In at least one embodiment of the present invention, the length of the drain is adjustable approximately 1.5 inches on either side. For example, a single drain unit can be used along a shower wall measuring 34.5" as well as a shower wall measuring 37.5". Accordingly, the number of variations of the embodiment that have to be produced for a variety of size shower stalls is reduced. The adjustability of the length permits the installer to accommodate shower stalls that are slightly too large or too small relative to their plan dimensions.

Terminology

The terms and phrases as indicated in quotes (" ") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive rather the term is inclusive meaning "either or both".

References in the specification to "one embodiment", "an embodiment", "a preferred embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiments and are not necessarily intended to be construed as limiting.

As applicable, the terms "about" or "generally" as used herein unless otherwise indicated means a margin of +−20%. Also, as applicable, the term "substantially" as used herein unless otherwise indicated means a margin of +−10%. Concerning angular measurements, "about" or "generally" refers to +−10 degrees and "substantially" refers to +−5.0 degrees unless otherwise indicated. It is to be appreciated that not all uses of the above terms are quantifiable such that the referenced ranges can be applied.

A Shower Stall Incorporating an Elongated Shower Drain

FIG. 1 is an illustration of a tiled shower stall 10 showing an elongated drain 100 extending substantially the entire length of the floor 14 proximate an intersection with an adjacent wall 12. Also shown in the figure is a raised tiled curb 16 along a front side of the stall. In many installations, a shower door can be stalled above the curb to fully enclose the stall. In yet other installations where the shower head is located a sufficient distance from the curb, a door may be unnecessary. Although not readily evident from the illustration, the tile floor 14 slopes gently towards the drain in substantially a single direction. Most codes in the United States require a slope of about 0.25 inches of drop for every 12 inches of floor run or stated another way a 2% slope.

There are several types of shower pans utilized in residential and commercial construction. Perhaps the most common type of pan is a molded one piece pan comprised of a polymeric resin that may be reinforced with fiberglass or another suitable material. These factory produced pans are typically provided with center drain holes and may even include a drain preinstalled therein. These prefabricated pans are typically not designed to receive tile over them and are most often used in lower to middle level residential construction. These types of pans are often not amenable to custom construction given the small number of sizes in which they are produced.

The various embodiments of the elongated drain are configured for use primarily with formed in place shower stall floors and pans as are typically used in high end residential construction. It is to be appreciated, however, that variations of the embodiments described herein can be configured for use with preformed pans.

There are numerous shower floor systems that can be utilized in a custom shower stall construction that are designed to receive tile flooring thereon. Traditionally, a bottom piece of a drain is secured to the drain pipe and secured to the subfloor. A layer of tar paper or other barrier material may be secured over the subfloor in some installations. Next, a pre-pan is fabricated using a dry pack concrete material on top of the shower stall's subfloor. The material is packed in place and leveled. After the pre-pan has cured, a waterproof liner membrane is secured in place over the top of the pre-pan. An opening only slightly larger than the drain's opening is cut in the membrane and an top drain piece is bolted to a flanged portion of the drain's bottom piece typically through bolt holes made in the membrane such that the top and bottom drain pieces sandwich the membrane as is extends around the drain opening. Next, an inner pan also comprised of dry pack is packed in place over the membrane. The inner pan is sloped and contoured as necessary. Before the dry pack has cured and often before the dry pack is placed over the membrane in some embodiments, the height of a prior art round drain's top is adjusted and set taking into account both the thickness of the inner pan, tiles and a thin-set mortar layer used to bond the tiles. Finally, once the inner pan has cured, the desired tiles are secured in place using a thin set or other suitable mortar mix.

Figure 17:
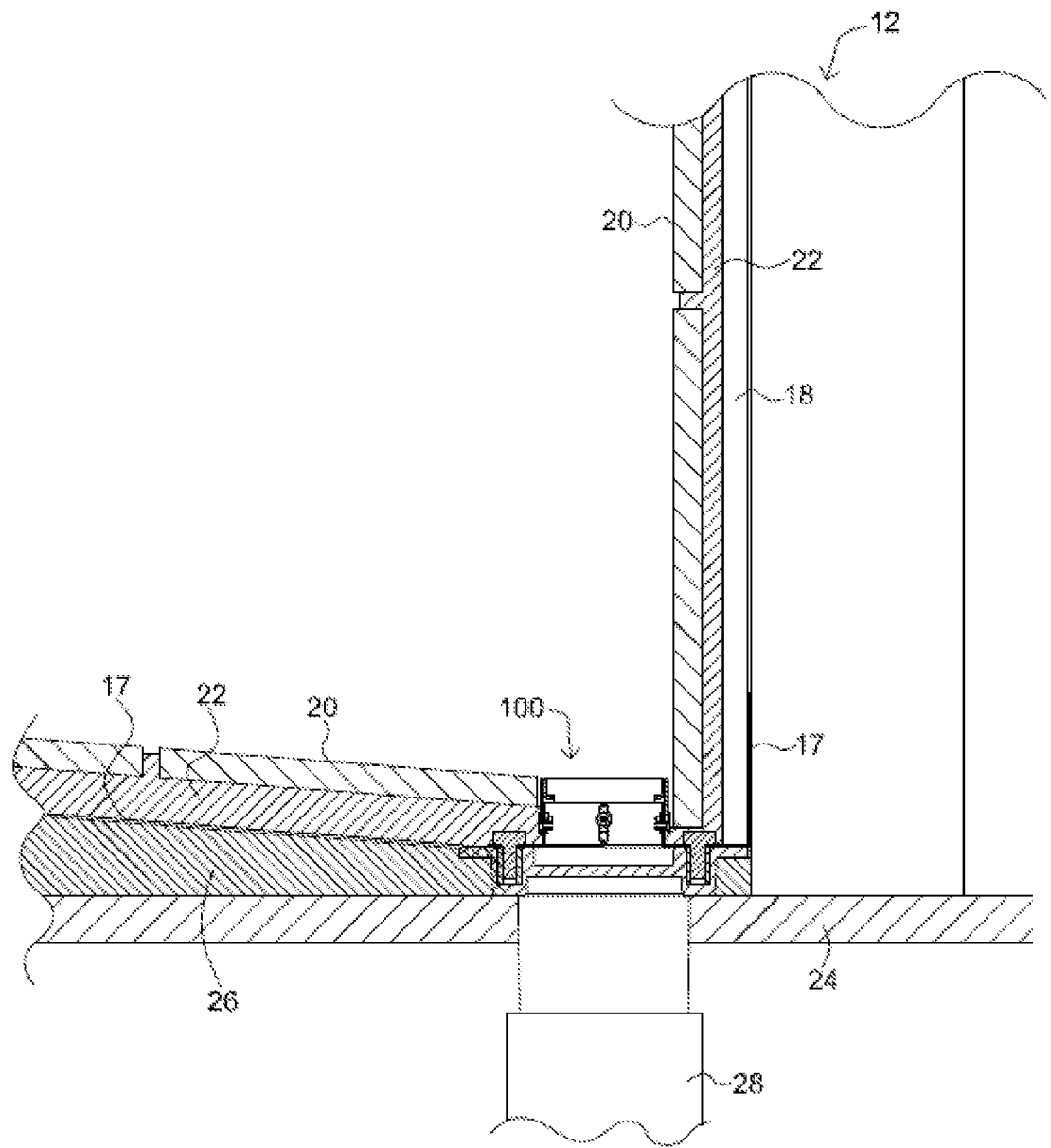
FIG. 17 is a cross sectional view of the elongated drain assembly installed in a shower stall according to one embodiment of the present invention.

Shower pans systems that do away with the inner pan have become popular. FIG. 17 provides an illustration of a cross section of this type of shower pan/floor configuration 14 as adapted for one embodiment of the present invention. The pre-pan 26 is constructed on top of the subfloor 24 in a manner similar to that described above except the pre-pan is sloped and contoured as necessary. Next, a specially configured waterproof membrane 17 that has an upwardly facing surface adapted to bond to thin set mortar is received over the pre-pan. The membrane is adhesively secured to the pre-pan substantially over the entirety of its downwardly facing surface. One suitable membrane material is NobleSeal TS produced by the Noble Company of Grand Haven, Mich. The membrane comprises a chlorinated polyethylene sheet with non-woven polyester laminated to both sides to facilitate adhesion of adhesives and thin-set thereto. NobleBond EXT adhesive also from Noble Company can be used to bond the membrane to the pre-pan. Next, thin set mortar 22 can be applied directly to the membrane and tile 20 set on top of it. Like above, the membrane is sandwiched between bottom and top pieces of the drain. The height of the drain is set prior to setting the tiles in place.

A First Embodiment Elongated Shower Drain Assembly

A first embodiment elongated shower drain assembly 100 is illustrated in FIGS. 2, 3, 15, 16 & 17 with the various individual components of the assembly being illustrated in FIGS. 4-14. The first embodiment assembly essentially comprises: (i) a base unit 102 that rests on the shower stall subfloor 24 and is coupled with a drain pipe 28; (ii) front and back long rail assemblies 104 & 106 that form front and back longitudinally-extending sidewalls; (iii) left and right short rail assemblies 108 & 110 that form left and right laterally-extending sidewalls; (iv) a grate 160 and (v) various fasteners 112 & 114 to join and secure the drain assembly together.

Figure 4:
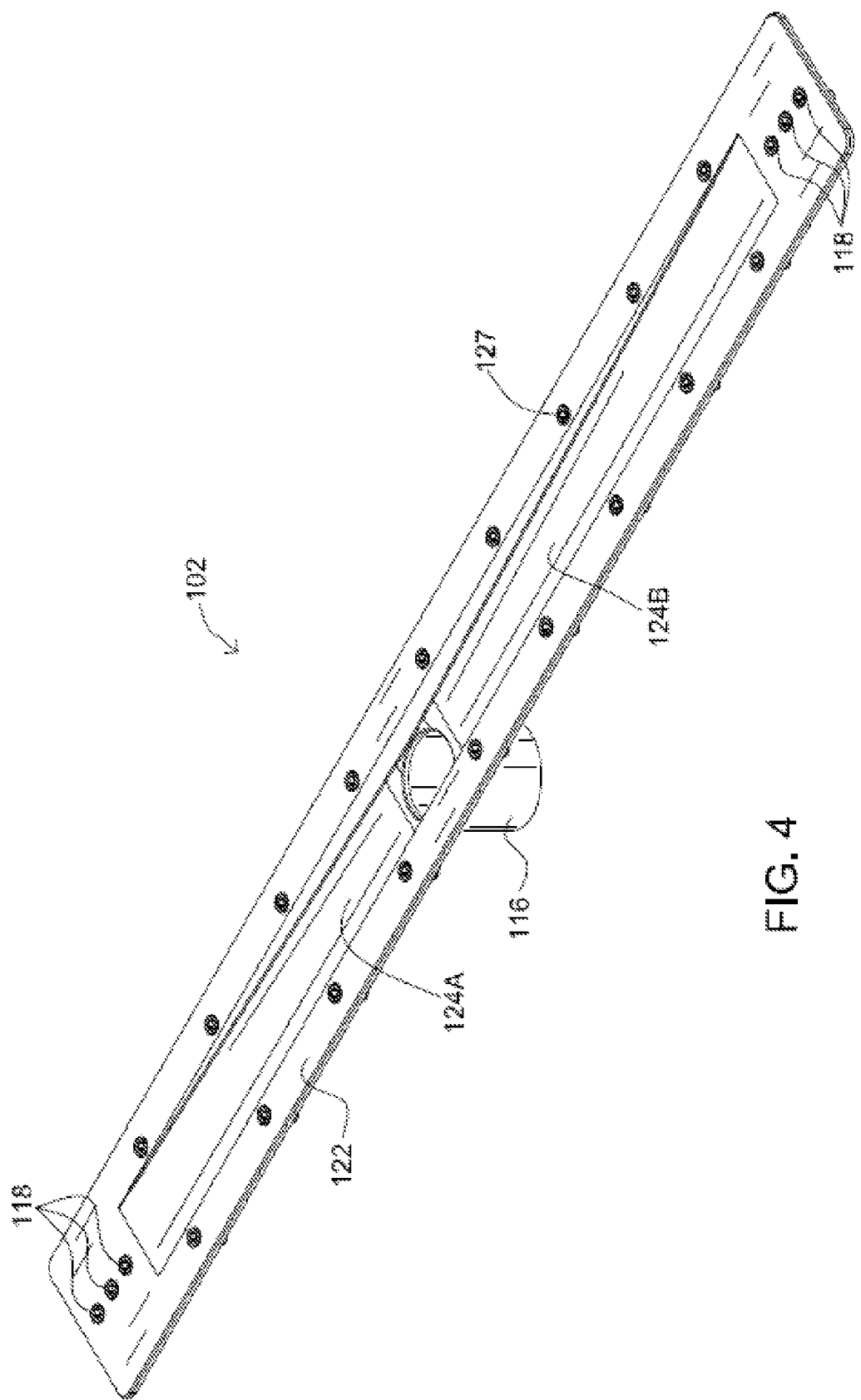
FIG. 4 is an isometric view of the drain base unit according to one embodiment of the present invention.
Figure 5:
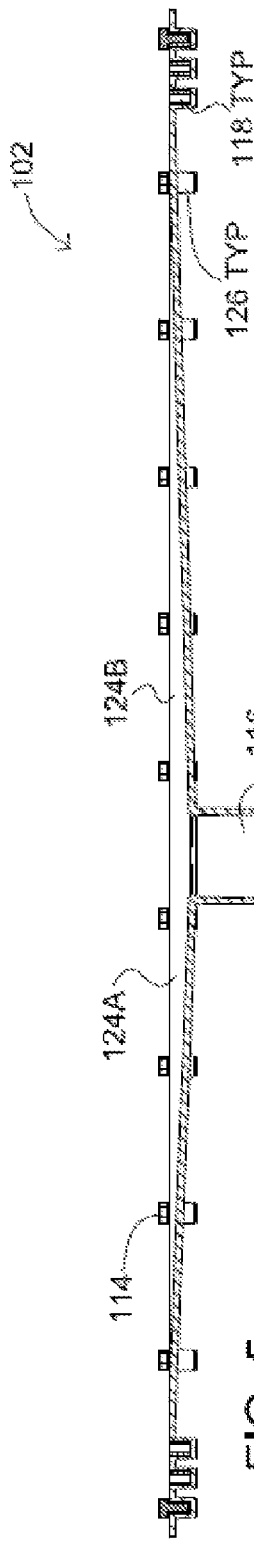
FIG. 5 is cross sectional side view of the drain base unit according to one embodiment of the present invention.

Referring primarily to FIGS. 4 & 5, the base unit 102 is illustrated. It is typically injection molded in ABS or PVC plastic to comply with different code requirements in the various states. The unit can be produced in a variety of different lengths to accommodate shower stalls of differing sizes. However, as indicated above the length of the base unit is adjustable to accommodate using a single unit for a range of differently sized shower stalls. For instance in one variation, the unit is about 39.4" in length but by selectively trimming its length on either or both ends, the unit can be used against shower stall walls varying from just under 36" to 39.4" in length. This feature is described in greater detail below. The width of the unit is typically about 4.3" although this can change on variations.

The base unit 102 forms a trough 124 that comprises left and right bottom portions 124A & 124B that slope gently towards a drain pipe connector 116, also referred to herein as a discharge opening, located generally proximate the center of the unit although the location can vary substantially so long as the respective left and right portions are suitably sloped towards the connector. The width of the trough is dictated largely by the diameter of the pipe connector which in turn is dictated by the diameter of the drain pipe. As per code in most states and locales, a 2" diameter shower drain pipe is required and as such the inside diameter of the connector and the width of the trough is typically slightly greater than 2".

Because of the slope, the depth of the trough 124 relative to the top surface of the unit 102 varies from zero at the respective left and right ends to its greatest depth at the pipe connector 116. The depth of the trough is largely dictated by the overall thickness of the base unit which in turn is determined at least in part by the configuration of the drain pipe within the confined depth provided by floor joists. In one variation, the overall thickness of the unit is about 2.75" from the bottom of the connector to the top surface and maximum depth of the trough is about 0.70".

A flange 122 surrounds the trough. In one variation, the flange is about 0.75" wide proximate the front and back elongated sides of the unit and about 3" wide proximate the shorter left and right ends. As hinted at above and described below the end flanges are subject to trimming to fit the unit in shower stalls with walls of different lengths. The thickness of the flange is about 0.160" except for the material comprising the various threaded bosses which is about 0.70" thick. The top surface of the flange is substantially flat and in use a waterproof membrane is received over it. The various rail assemblies are then placed on top of the membrane and coupled to the base unit by way of threaded fasteners 112 thereby sandwiching and sealing the membrane to prevent water from seeping underneath the membrane and on to the pre-pan and possibly the subfloor.

A variety of threaded bosses 118 & 126 are provided on the flange 122. The bosses comprise threaded brass 127 inserts that are molded in situ. In one variation, there are nine bosses distributed along each of the front and back flange portions and three longitudinally aligned bosses on each of the left and right end flange portions. The bosses are adapted to receive ¼" hex head bolts 112 therein. As can best be seen in FIG. 5, the bottoms of the bosses extend downwardly beyond the bottom of the flange. As such, it is the bottoms of the bosses that are typically in contact with the surface of the subfloor when the unit is secured to the drain pipe.

As noted above, the left and right ends include three longitudinally aligned bosses 118. However when attaching the left and right short rail assemblies to the base unit, only a single bolt 112 and associated boss are utilized. It is appreciated that the length of the left and right flanges are cut to adjust the length of the base unit for shower stall walls of differing lengths. The two outermost remaining bosses are then used to secure the short rail assemblies. If a boss to the inside of the utilized boss remains, it can be filled with adhesive as desired or left as is since the bottom of the boss is enclosed and only a small and generally insignificant volume of water will fill the cavity during use.

To install the base unit 102, its location on the subfloor 24 typically immediately adjacent a shower stall wall 12 is determined. It is to be appreciated that the drain 100 can be installed in other locations even spanning the shower stall floor; however, in most circumstances installing the drain at an edge of the pan is both easier and more cost effective as well as the most aesthetically pleasing. As an initial matter, the necessary and desired location of the drain pipe 28 in the shower stall is determined and the plumbing is suitably configured. A small hole is made in the subfloor to provide access to the end of the pipe.

The pipe connector 116 is then adhesively bonded or solvent fused to the end of the drain pipe 28 such that the drain effectively rests flat on the subfloor 24 in a desired orientation with primarily the bottom ends of the bosses being in contact with the subfloor. Next, the pre-pan 26 is constructed. In a system that does not use an inner pan, such as is illustrated in FIG. 17, the pre-pan is sloped about 0.25" for every foot in a single direction towards the drain. The dry pack concrete can be packed underneath the base unit filling some if not all the space between the bosses to better fix and secure the drain in place, although this is not necessary in all circumstances for a successful installation.

After the pre-pan 26 has cured, the waterproof membrane 17 is fit in place. In the case of a system wherein an inner pan will be constructed, the membrane is typically laid over the subfloor and secured on the stall walls several inches above the pre-pan. Where the membrane is type that eschews the need for an inner pan, the membrane is adhesively bonded to the pre-pan and optionally to the top of the flange 122 on the base unit 102. Furthermore, the membrane is typically folded and run the walls 12 of the stall to create a waterproof basin. As shown in FIG. 17, the membrane is located directly against the studs and drywall or backer board 18 is secured over the membrane. It is to be understood that the membrane can be attached over the drywall as well to protect the drywall material from water infiltration.

Next, holes are made through the membrane coincident with the threaded bosses in the base unit and hex-head bolts 112 are passed therethrough and threadably received in the bosses 118 & 126 although not fully tightened therein. Additionally, a rectangular piece of membrane located directly above the trough 124 can be cut away to reveal the trough at this point or the membrane can be cut at a later stage of installation after the rail assemblies are installed.

Figure 2:
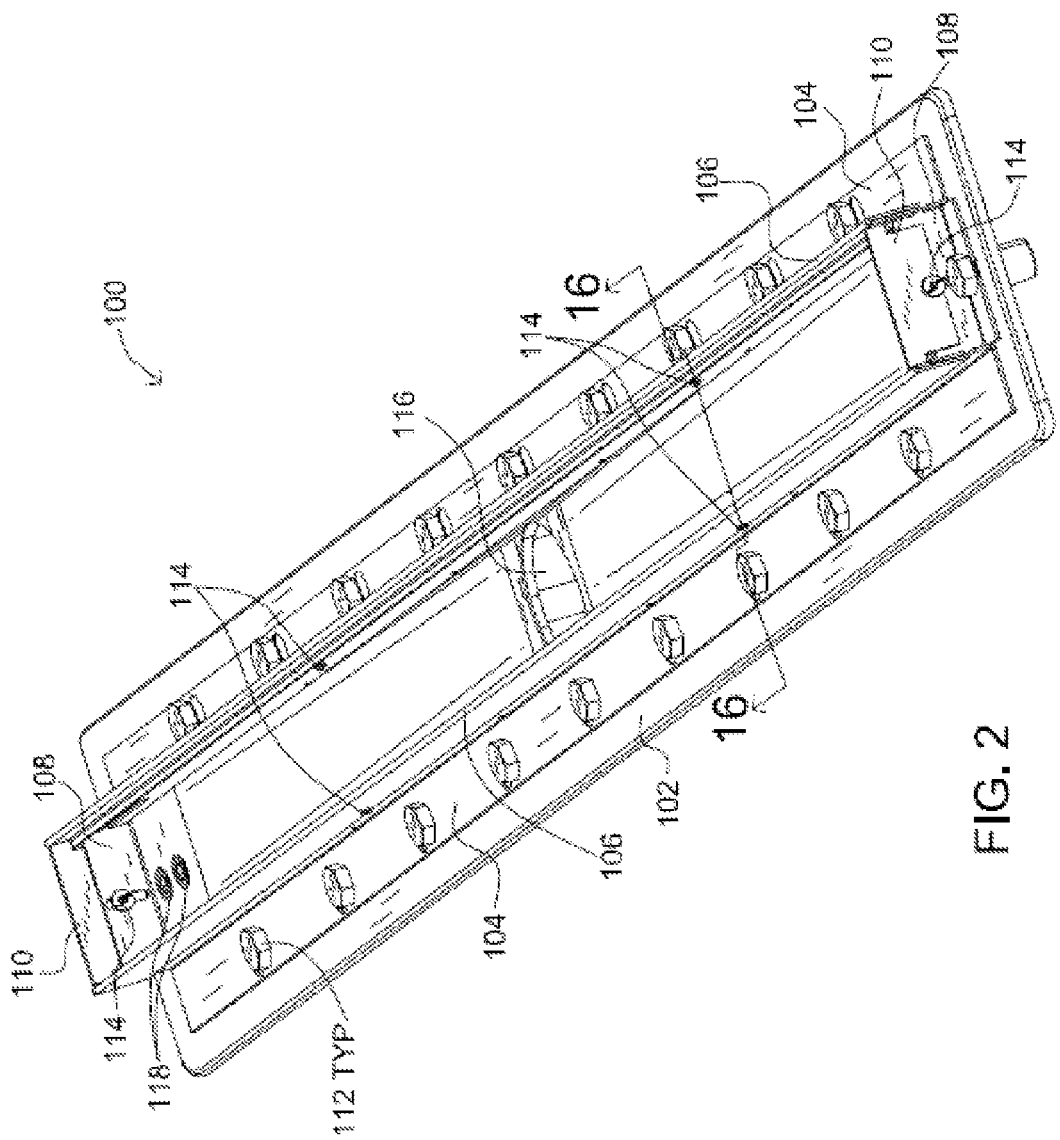
FIG. 2 is an isometric view of the elongated drain assembly according to one embodiment of the present invention.
Figure 3:
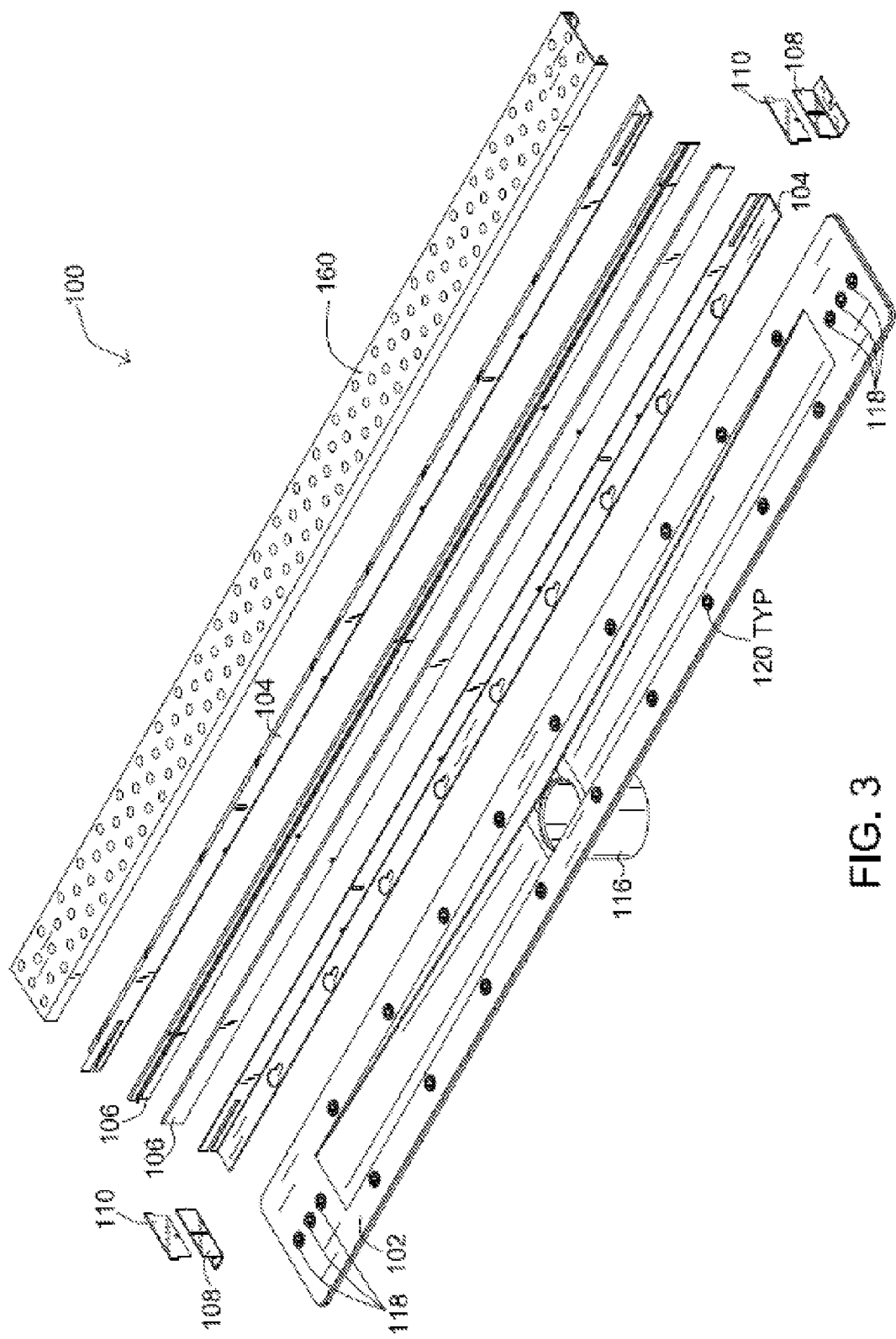
FIG. 3 is an exploded isometric view of the elongated drain assembly of FIG. 2 according to one embodiment of the present invention.

Referring primarily to FIG. 2, the front and back rail assemblies each comprise in combination a lower long rail 104, an upper long rail 106 and associated socket head adjustment fasteners 114 to couple the upper and lower pieces to together and permit adjustment of the pieces relative to each other.

Figure 6:
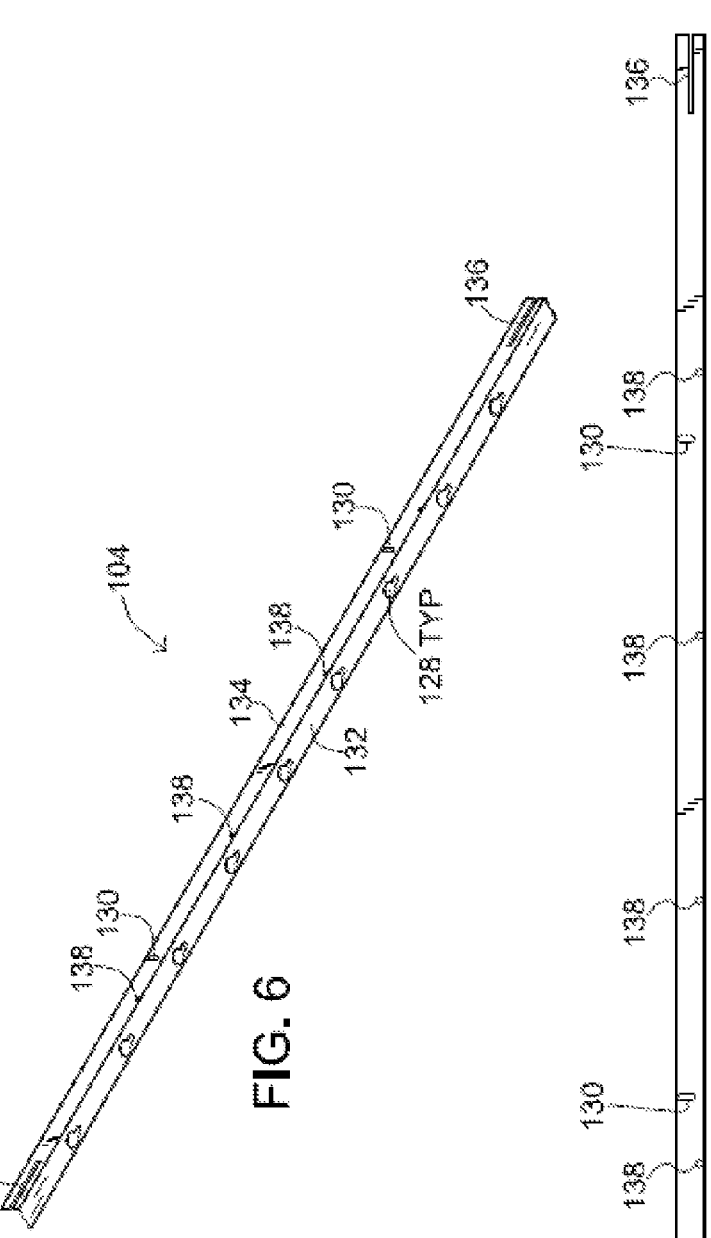
FIG. 6 is an isometric view of the lower long rail according to one embodiment of the present invention.
Figure 7:
FIG. 7 is a side view of the lower long rail of FIG. 6 according to one embodiment of the present invention.

Referring primarily to FIGS. 6-8, the lower long rail 104 typically comprises a stainless steel elongated L-shaped piece of stainless steel plate having a generally horizontally-extending leg 132 and an intersecting vertically-extending leg 134. In one variation, the width of the horizontally-extending leg is about 0.8" wide and the vertically-extending leg has a height of about 0.65". Most notable on the horizontally-extending leg are the plurality of spaced slotted bolt holes 128, also referred to herein as keyhole-shaped openings. The openings are operatively aligned with the threaded bosses 126 that extended along the front and back portions of the base unit flange 122. The larger portion of each bolt hole is slightly greater in diameter than the diameter of the 0.25" hex bolts' heads 112; whereas the slotted portion is smaller in width than the diameter of the head but slightly wider than the fasteners' shafts. Accordingly, the entire lower long rail 104, typically with the upper long rail 106 secured thereto, can be slid over the plurality of heads of the hex head fasteners, which were previously secured into the base unit through the membrane, and then slid rightwardly to lock the rail in place at which point the bolts can be tightened to secure the rail assembly and tightly sandwich the membrane.

Advantageously, the use of slotted bolt holes 128 makes the installation of the rail assemblies significantly easier and less time consuming. As can be appreciated, first cutting holes in a membrane directly above the base unit's threaded bosses 126, placing a plate with standard sized round bolt holes, such as an alternative lower leg of a lower long rail, over the various membrane holes and finally trying to threaded each and everyone of the plurality of bolts through the bolt holes and openings to engage and tighten the bolts in place might prove to be frustrating. It is likely that one or more membrane holes could become misaligned relative to the threaded boss and the associated bolt hole in the plate such as to make threading the bolt impossible and since the membrane is sandwiched between the base unit and the plate making adjustment of the membrane more difficult. In contrast, by using slotted bolt holes the installer only has to be concerned with aligning the membrane with the respective bosses when installing the bolts. Where some misalignment between the membrane and the base unit bosses occur, the membrane is exposed and more easily manipulated by the installer.

Referring to FIGS. 6&7, several significant features are provided on the vertically-extending leg 134. First, open ended elongated slots 136 extend horizontally inwardly from the respective left and right edges of the leg. In one variation, the slots are about two inches long and about an eighth of an inch wide. As is described later, the slots receive tabs on the short rail assemblies to help hold the short rail assemblies in proper alignment with the long rail assemblies.

Also provided on the vertically-extending leg are a pair of vertically extending slots 130 that in one variation are about 0.40" in length and 0.125" wide. These slots interface with a pair of holes 142 on the upper long rail to receive cap screw adjustment fasteners 114 therethrough and permit the vertical adjustment of the upper rails 106 to account for different thickness of the adjacent tile floor helping ensure that the drain's grate is effectively level with the top surface of the floor. One variation permits about 0.25" of vertical adjustment but variations permitting additional adjustment are also possible.

Several weep holes 138 are located on the vertically-extending leg 134 proximate the intersection with the horizontally-extending leg 132. The purpose of the weep holes is to permit water that penetrates between the edge of the floor tile butting up against the long rail assembly and the outside surface of the long rail assembly to drain into the trough 124 rather than be trapped where it can built up and potentially cause damage or facilitate conditions for the growth of mold or other microorganisms. While three weep holes are illustrated more or fewer can be specified in variations. Further, additional weep holes can be incorporated in the short rail assemblies as well.

Referring to FIGS. 9&10, an upper long rail 106 is illustrated. The upper long rail is also typically comprised of stainless steel plate that is formed through bending operations. In at least one variation the height of the upper long rail is about 0.70". Of specific note, the upper long rail includes the aforementioned pair of holes 142 located generally proximate a bottom edge thereof that interface and align with the slots 130 in the lower long rail. Typically, the holes are either threaded or small threaded inserts are affixed to the holes to threadably receive small stainless steel cap screws 114 therein.

Specifically to attach the upper long rail 106 to the lower long rail 104 with reference to FIG. 2, an inside surface of the upper long rail is placed against an outside surface of the lower long rail. The respective upper long rails holes 142 and lower long rail slots 130 are aligned and small cap screws 114 are placed first through the slots from the inside surface of the lower long rail and secured to the threaded holes of the upper long rails. When the cap screws are loose the height of the long rail assemblies can be adjusted by moving the upper long rail upwardly or downwardly. By tightening the screws the height of the long rail assemblies can be fixed. It is appreciated that by using a small hex head wrench, the user can adjust the height of the respective long rail assemblies after the assemblies are secured to the base unit 102.

Referring primarily to FIG. 10, at the top edge of the upper long rail 106 the stainless plate is bent 180 degrees over onto itself. Further, a 90 degree second bend is made to the sheet to form a horizontal ledge 144. In one variation the ledge is located approximately 0.30" below the top edge and is about 0.10" wide. The front and back opposing and facing ledges receive the legs of the C-shaped grate 160 thereon with the abutting vertical sidewall acting to prevent the grate from sliding widthwise off of the drain.

Typically, the length of the upper and lower long rails are slightly shorter than the length of the corresponding base unit 102. For instance in the variation wherein the base unit is about 39.4 inches long, the long rails are about 37.8" long. When the base unit is trimmed on the ends to fit along walls small than the drain assembly's length, the long rails are also trimmed. The length of the elongated slots at either end of the lower long rails are sufficient in length that even if trimmed the maximum amount for a particular base unit, enough length of the slot will remain to receive the tabs of the lower short rail 108 therein upon assembly.

Referring primarily to FIG. 2, the left and right short rail assemblies each comprise in combination a lower short rail 108, an upper short rail 110 and an associated socket head adjustment fastener 114 to couple the upper and lower pieces to together and permit adjustment of the pieces relative to each other. The length of the short rail assembly is essentially the same as the inside distance between opposing front and back long rail assemblies when they are installed on the base unit 102. Accordingly, the left and right short rail assemblies typically fit snuggly between and perpendicular to the long rail assemblies at their respective ends to create the rectangular form over which the grate 160 is received. In one variation the approximate width between the insides of the long rail assemblies is about 1.75". It is appreciated that in some variations that the width of the trough 124 is slightly greater than the span between the front and back long rail assemblies and as such the long rail assemblies overhang the respective edges of the trough a small amount. In contrast, the short rail assemblies are typically setback at least a small amount from the left and right edges of the trough and as such do not overhang the trough. For instance, wherein the outermost bosses 118 of the three aligned bosses are utilized to secure the short rail assemblies to the base unit, the inside surfaces of the short rail assemblies are setback from the edge of the trough a significant distance.

The lower short rail 108 is illustrated in FIGS. 11 & 12. Like the lower long rail, the short rail comprises a horizontally-extending leg 150 and a vertically-extending leg 152. Also like the long rail, the short rail is typically fabricated from stainless steel sheet. The width of the horizontally-extending leg in one variation is about 0.50" while the height of the vertically-extending leg is about 0.70".

The horizontally-extending leg 150 includes an open ended slot 146 located proximate the leg's lengthwise center. Through this slot a hex head bolt 112 is received to couple the lower short rail to the base unit by way of a chosen threaded boss 118. Like the lower long rail, the lower short rail 108 when installed tightly sandwiches the water proof membrane against the base unit flange 122 to effectively seal it.

The vertically-extending leg 152 includes an elongated vertically-extending slot 148 that interfaces with a hole 156 on the upper short rail 110 to receive a cap screw adjustment fastener 114 therethrough and permit the vertical adjustment of the upper short rail to account for different thickness of the adjacent tile floor to help ensure the drain grate 160 is effectively level with the top surface of the floor. One variation permits about 0.25" of vertical adjustment but variations permitting other amounts of adjustment are also possible.

Along each of the right and left vertical edges of the vertically-extending leg 152, a tab 154 extends outwardly a short distance (in one variation about 0.40") therefrom. The tabs are received into the corresponding end slots 136 in the vertically-extending leg 134 of the lower long rail 102. The tabs and slots in combination act to align and hold the short rail assemblies in their proper positions relative to the long rail assemblies.

Figure 15:
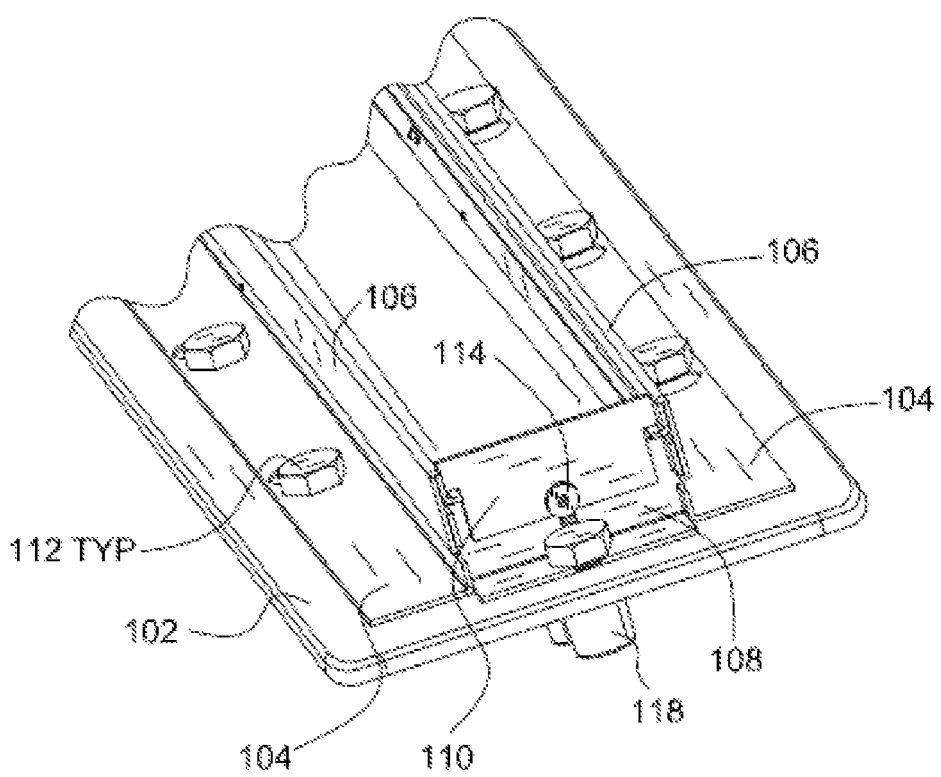
FIG. 15 is first partial isometric view of the assembly of FIG. 2 primarily illustrating the interconnection between the short rails with both the long rails and the drain base unit according to an embodiment of the present invention.
Figure 16:
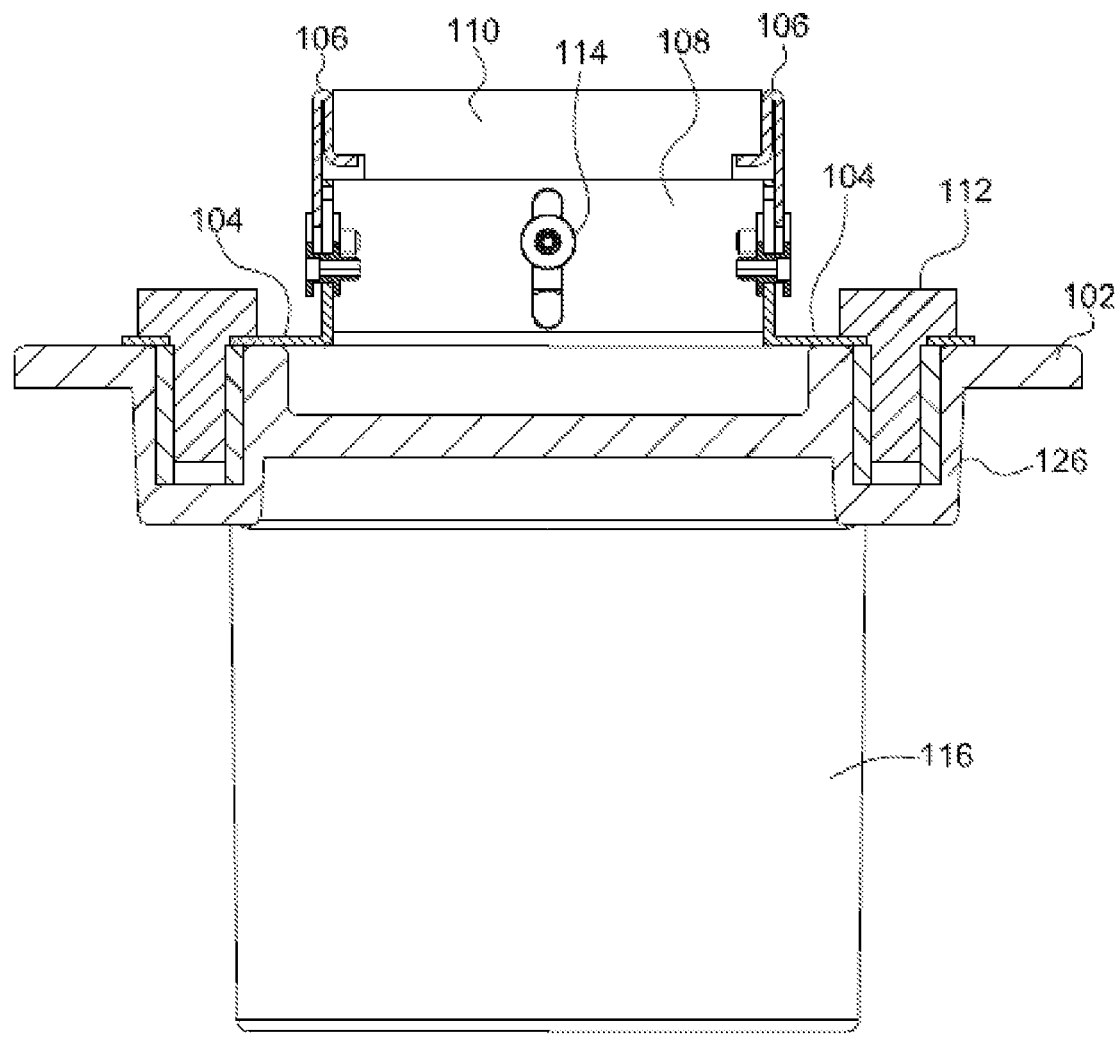
FIG. 16 is a cross sectional end view taken along lines 16-16 of FIG. 2 primarily illustrating the interconnection of the lower long rail with the drain base and the upper long rail.

The upper short rail 110 is illustrated in FIG. 13 and comprises a similar stainless steel plate as the other rail pieces. It is flat and generally rectangular in shape except that an upper portion of the rail is wider than a lower portion thereby giving the piece a T-shape and creating left and right overhangs 158. As can be best seen in FIG. 16, the overhangs rest on the corresponding ledges 144 formed in the upper long rails. As can be seen in FIGS. 15, 16 & 17, the top edge of the upper short rail in the illustrated embodiment is located approximately level with the top edge of the upper long rail; however, this can vary in variations depending in part on the configuration of the grate and how it is configured to interface with the remainder of the drain assembly.

Also of significance, the upper short rail 110 includes a hole 156 located generally proximate a bottom edge thereof that interfaces and aligns with the slot 148 in the lower short rail. Typically, the hole is either threaded or a small threaded insert is affixed to the hole to threadably receive a small stainless steel cap screw 114 therein. As with the similar features on the long rail assemblies, loosening the cap screw permits the installer to raise or lower the overall height of the short rail assembly as is necessary depending on the height build of expected for the adjacent tile shower floor.

Prior to installing a front and back lower long rails 108 to the base unit 102 as described above, the long rail assemblies are assembled by at least loosely securing the upper long rail 106 to the lower long rails 104 using the stainless steel cap screws 114. The expected necessary height of the assemblies can be calculated prior to installing the assemblies to the base unit wherein the height of the assemblies may be set by tightening the cap screws prior to installation on the base unit. Alternatively, an installer can decide to keep the cap screws loose with the intent of adjusting the height and tightening the cap screws once the rail assemblies are installed. By doing the later, the installer can potentially dry stack the tile and spacers representing the mortar to more accurately determine the actual stack height of the floor proximate the drain assembly.

Also prior to attaching the short rail assemblies to the base unit 102, the lower and upper short rails 108 & 110 are loosely joined together. Typically, the long rail assemblies are installed to the base unit 102 first and firmly secured in place. Next, the short rail assemblies are installed by sliding the lower rail tabs 154 into the corresponding slots of the lower long rails 136. The overhangs 158 of the upper short rails are rested on the corresponding ledges 144 of the upper long rails and as such the height of the short rail assemblies conforms to height of the long rail assemblies. Presumably, the hex head bolt 112 for each end has been partially threaded into a corresponding boss in the base unit in a manner similar to that described above for the installation of the long rail assemblies. The horizontally-extending arm 150 of the lower short rail is then slid under the head of the bolt such that the bolt's shaft is received in the open ended slot 146. The longitudinal position of the short rail assemblies are adjusted as necessary and the respective hex head bolts 112 are tightened in place. Finally, once the heights of the long rails are set, the cap screws 114 of the short rail assemblies are tightened to fix the height of the short rail assemblies as well.

Although not necessary, an installer may choose to seal the intersections of the short rail assemblies with the long rail assemblies with a bead of a suitable chalking material to further contain water within the drain. Alternatively, the installer may decide that any gaps in the intersections or any exposed portions of the lower long rail slots are available to act as additional weep paths to clear water that has seeped below the surface of the tile floor and the edges of the elongated drain.

The foregoing describes one manner of assembling and installing the first embodiment shower drain assembly; however, other methodologies and variations on the described methodology are contemplated as would be obvious to one of ordinary skill in the art having the benefit of this disclosure.

Figure 14:
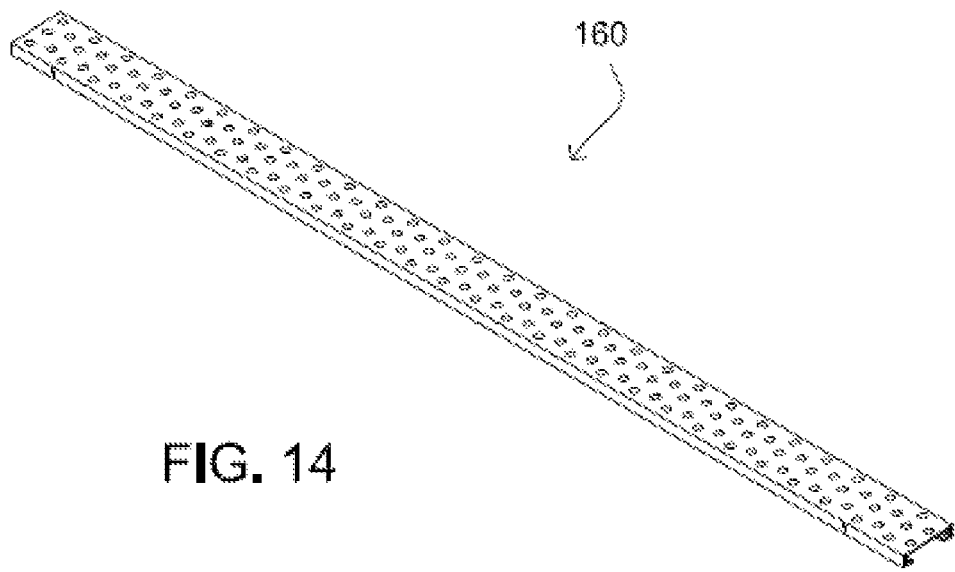
FIG. 14 is an isometric view of the C-shaped grate an isometric view of the lower short rail according to one embodiment of the present invention.

A typical grate 160 that is utilized to cover the rest of the elongated drain assembly is illustrated in FIG. 14. The grate can be made of stainless steel, aluminum or even reinforced or unreinforced plastics. As illustrated, it is generally C-shaped with narrow horizontally disposed lips at the bottom end thereof. As seen in FIG. 17, the bottom surfaces of the lips rest on the ledges of the upper long rails, which support the grate in place.

The length of a grate provided with the described embodiment is at least the same as the maximum length of the rectangular drain form that can be configured using the rail assemblies. If the drain assembly is shortened for use in small shower stalls, the grate can be cut to length as necessary as well. It is to be appreciated that a similar grate structure is used in the second embodiment elongated drain assembly described below.

A Second Embodiment Elongated Shower Drain Assembly

Figure 18:
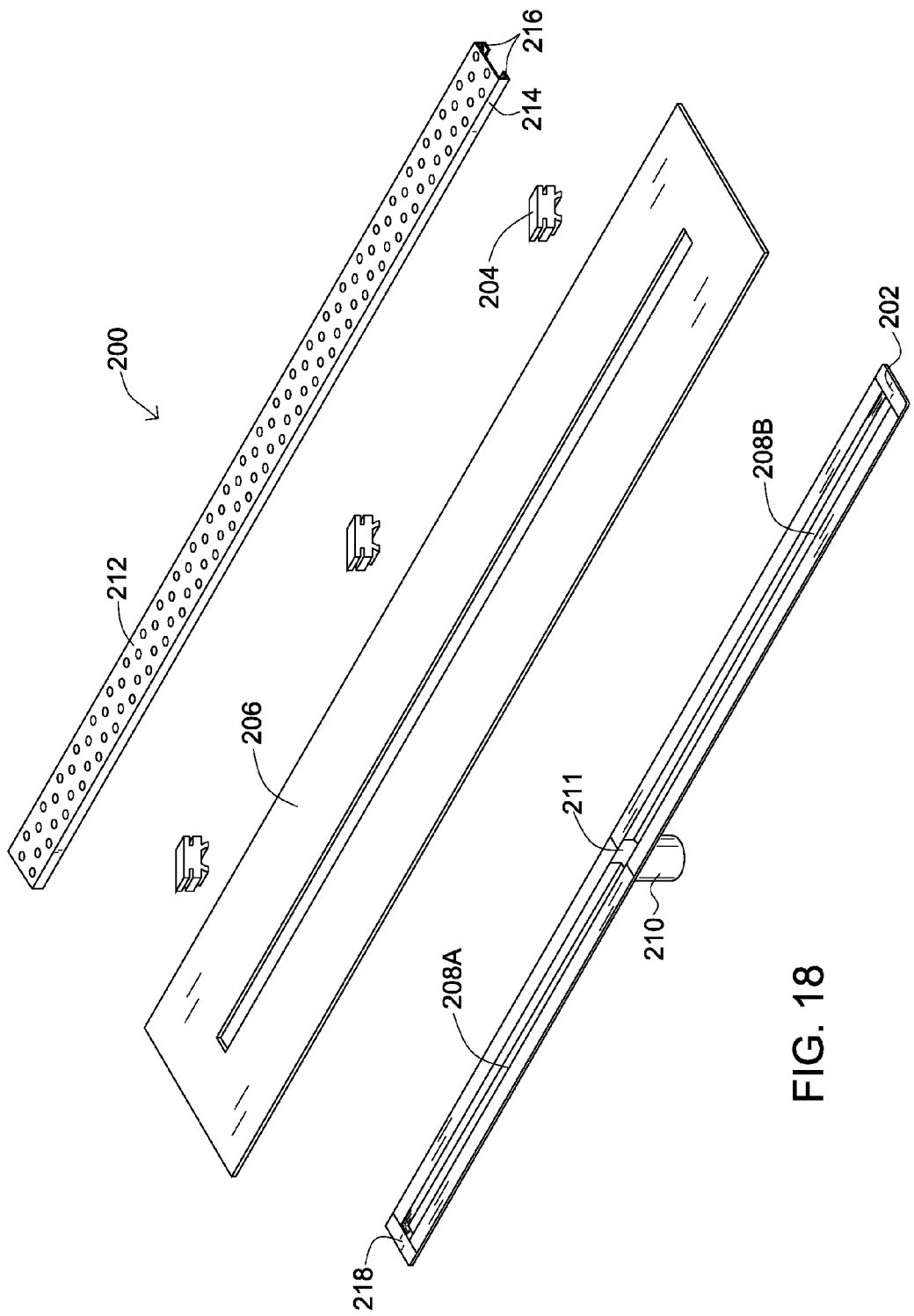
FIG. 18 is an exploded view of an elongated drain assembly according to another embodiment of the present invention.
Figure 19:
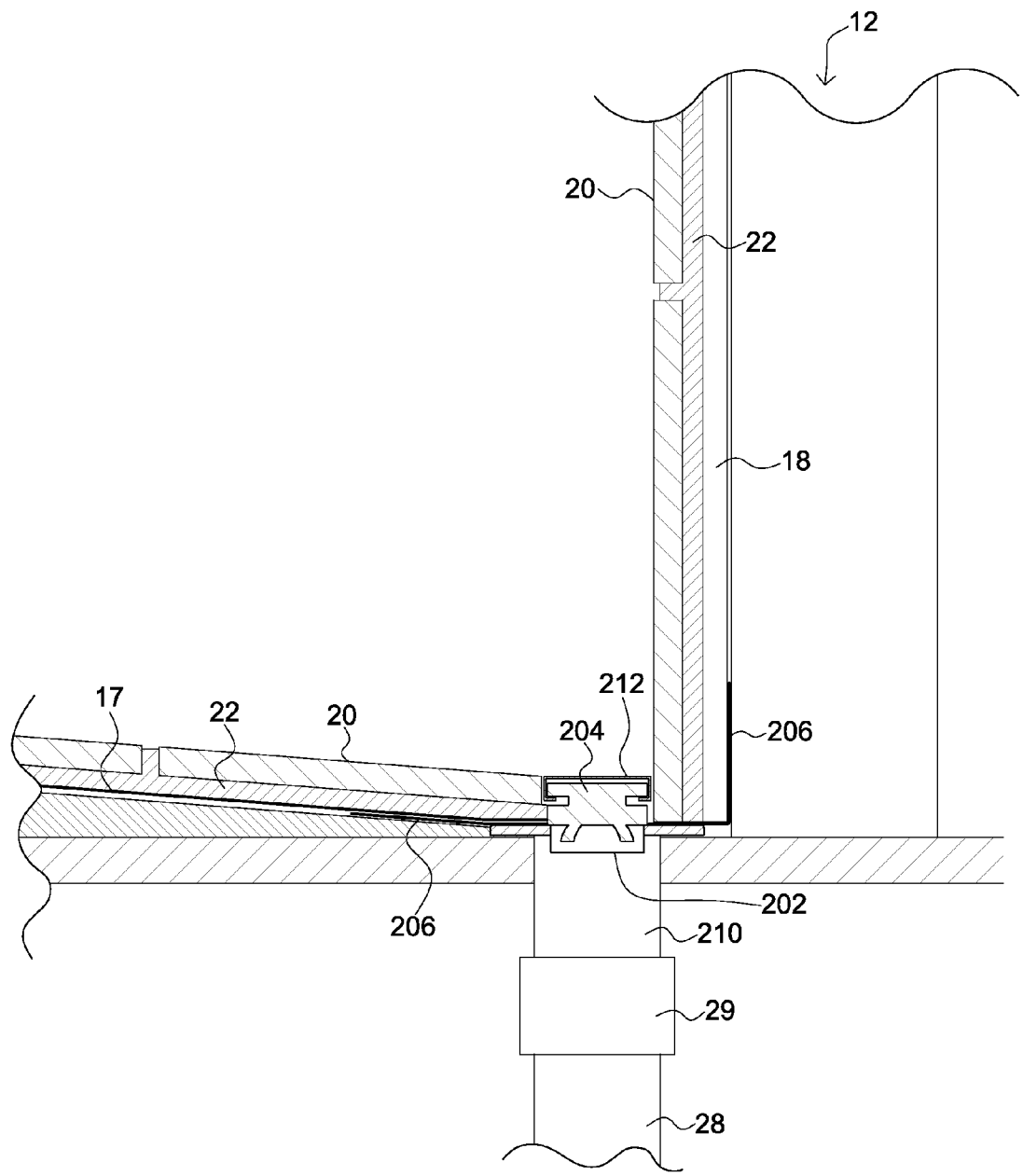
FIG. 19 is a cross sectional view of the elongated drain assembly installed in a shower stall according to the other embodiment of the present invention.
Figure 20:
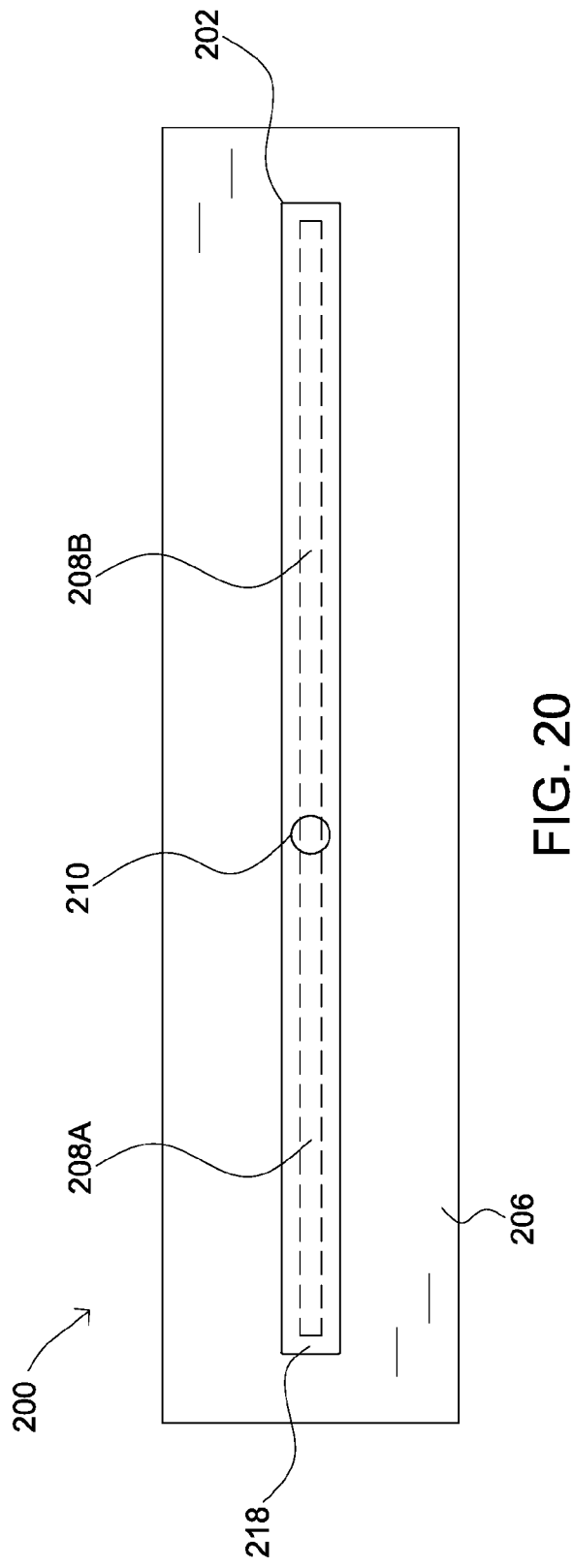
FIG. 20 is a bottom view of the drain base with a waterproof membrane flange secured thereto according to the other embodiment of the present invention.
Figure 21:
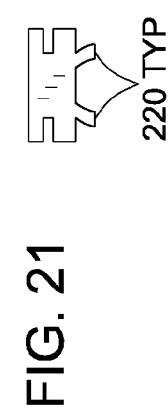
FIG. 21 is side view of several drain grate spacers of differing heights according to the other embodiment of the present invention.

A second embodiment elongated shower drain assembly 200 is illustrated in FIGS. 18 & 19 with some of the various individual components of the assembly being illustrated in FIGS. 20 & 21. The second embodiment assembly essentially comprises: (i) a base unit 202 that rests on the shower stall subfloor and couples with a drain pipe; (ii) a flange 206 made from a waterproof membrane; (iii) a grate 212; and (iv) a plurality of grate spacers 204 to couple the grate with the base unit.

Since in at least one variation the outside diameter of the drain pipe connector 210 is typically smaller or the same size as a typical 2" drain pipe, a coupler 29 is utilized to join the drain to the drain pipe. In some variations as shown in FIG. 19, the coupler is straight facilitating the attachment of the drain pipe 28 to the bottom of the drain. In other variations, a 90 degree elbow connector (not shown) is provided that permits the drain to be coupled with side entry drain pipes.

One embodiment of the base unit 202 as shown in FIG. 18 is comprised of stainless steel although other variations can be fabricated from any suitable material including but not limited to PVC and ABS plastics. The stainless steel variation is typically fabricated from sheet stock that is cut and bent to shape and welded, soldered or adhesively joined and sealed at the various intersections of the formed plate. Alternatively, the base unit can be formed using other known fabrication techniques or combinations of techniques. As can be appreciated ABS and PVC variations of the base unit are typically unitarily molded.

The base unit 202 forms a trough 208 that comprises left and right portions 208A & 208B that slope gently towards a drain pipe connector 210 located generally proximate but center of the unit although the location in variations can vary substantially so long as the respective left and right portions are suitably sloped towards the connector. The width of the trough can vary significantly but in one variation it is about 1.0" making an installed drain less visually obtrusive.

As can be ascertained from the Figures, the inside diameter of the pipe connector 210 in the illustrated embodiment is typically greater than the width of the trough 208. The pipe connector where it interfaces and is connected to the trough overlaps the sides of the trough. An opening 209 is formed through the trough's bottom surface and includes portions 211 that extend up the opposing side surfaces to permit a greater flow of waste water into the pipe connector.

A flange 218 extends around the perimeter of the trough and is about 1.0" wide. The flange typically rests upon the surface of the shower subfloor 24 when the drain 100 is installed and provides physical support for the drain when installed. The drain is typically attached to the shower stall subfloor at the flange either through the use of fasteners, such as screws, or adhesive bonding. Further, the top surface of a flange provides a bonding surface for securing the extended waterproof membrane flange 206 to the base unit 202.

The membrane flange 206 is also best illustrated in FIG. 18. The rectangular membrane can comprise any suitable waterproof sheet material of the type commonly used in shower stall installations; however, a membrane that has an upwardly facing surface adapted to bond to thin set mortar, such as NobleSeal TS, is preferred in circumstances wherein no inner pan is to be used. The center of the flange comprises a rectangular opening corresponding to the size of the trough opening. Typically two parallel beads of adhesive sealant, such as Noblebond EXT, are applied to the flange of the base unit set back from the edge thereof about 0.25"-0.50" and the membrane flange is pressed into the sealant to affix it in place.

To install the drain in a shower stall having a plywood, OSB or other wood subfloor 24, the length of the floor proximate the desired installation location is measured. A second embodiment drain assembly 100 is selected whose length is less than but at preferably close to the measured length. Unlike the first embodiment, the second embodiment is not length adjustable and as such the proper length assembly must be selected prior to installation. Accordingly in some installations, it may be necessary to slope short distances of floor tiles 20 and/or portions of the shower pan located at either end of the drain towards the drain slightly.

Next, optionally using a template provided with the drain assembly, an elongated opening is cut to receive the drain therein. This differs from the first embodiment drain in that the trough 208 is located substantially below the surface of the subfloor. As an example, for the variation of the drain base unit 202 having a 1.0" wide trough and a 3.0" wide width from the opposing longitudinal edges of the base unit flange 218, an about 1.75" wide opening will be cut at a length 1-2" less than the length of the base unit. As can be appreciated, additional material may need to be cut out of the floor proximate the location of the pipe connector 210 to accommodate its large diameter. Furthermore, if a side discharge coupler is being utilized an additional cutout may be required to permit proper attachment of the drain assembly to the drain pipe 28.

The drain base unit 202 with the membrane flange 206 attached thereto is then placed within the opening and the unit's pipe connector 210 is secured to the household drain pipe 28 typically using an appropriate coupler 29. With the membrane flange 206 rolled or folded inwardly to expose the edges of the base unit flange 218, the base unit is fastened in place by driving screws or other suitable fasteners through the exposed portion of the flange and into the overlapping portions of the subfloor 24.

Next, the shower stall floor is sloped towards the drain, typically about 2%. This can be accomplished using a dry pack that is extended up to an edge of the base unit or since the slope is simple proceeding in a single direction, appropriately tapered plywood, OSB or backer board sheet(s) can be laid down and secured in place. In one variation, a sloped sheet 32 of high density foam is utilized. The foam can be bought in a pre-sloped form and is cut as necessary to match the dimensions of the shower stall. If tapered sheet stock is utilized it is typically adhesively and/or mechanically fastened to the underlying subfloor.

The membrane flange 206 is then unrolled and secured to the sloped floor using a thin-set mortar or other suitable adhesive, such as NobleBond EXT. Since one longitudinal side and both end sides abut the walls 12 of the shower stall, the membrane is secured to the framing typically using staples or nails. Using procedures known well known in the industry for shower pan membranes, the membrane flange is folded as necessary to secure and fasten it into the corner wall intersections of the stall. Typically, it is advisable to mechanically fasten the membrane flange to the wall at a distance of at least 2" above the surface of the floor.

Thin-set mortar or other suitable adhesive is applied to the entirety of the sloped floor including the portion of the membrane flange that has been secured to the floor but leaving the membrane flange thin-set free about 1" from the edge of the trough opening. Along this 1" edge two parallel beads of an appropriate flexible sealant are applied. An appropriate membrane 17, such as NobleSeal TS, is placed over the sloped floor and secured in place by pressing it into the mortar and the beads of sealant. The edges of the membrane are then secured to the wall studs using well known practices. Finally, tiles 20 can be set in place directly over the membrane using a thin-set mortar 22. Further, as applicable, the walls 12 of the stall are also tiled typically over drywall or backer board 18 that has been previously secured to the wall studs.

The drain grate 212, also best shown in FIG. 18 is substantially similar to the grate described above with reference to the first embodiment. In addition to a perforated top surface, it includes to generally vertically orientated downwardly extending sides that each intersect with an in-turned generally horizontal lip. In the embodiment comprising the 1" wide trough, the grate is about 2" wide with a length that is as long or slightly longer than that of the trough 208.

The grate is secured to the base unit by way of a plurality of spacers 204 as illustrated in FIGS. 18, 19 and 21. The spacers each includes a pair of opposing biasing legs 220 that are spaced about 1.1" apart from the outside bottom edge to outside bottom edge and spaced apart just under 1.0" at the leg's upper edges wherein it intersects with the spacers body. The body of each spacer is generally rectangular in shape with two opposing open end slots 222 extending inwardly from opposing vertically orientated sides. The slots are spaced from the bottom side of the body where it intersects with the tops of the biasing legs a predetermined height 224. Spacers are typically available in a number of different heights to account for different overall thickness of tiled shower floors as is described in greater detail below.

FIG. 19 is a cross sectional view of the second embodiment drain 200 assembled and installed in a shower floor. As can be seen the opposing slots 222, or grate attachment, of the spacers 204 receive the lips of the grate 216 therein to support and hold the grate in its finished configuration. Typically, three or more spacers are slid on to the grate from its ends and spaced along the grate to provide the necessary support. The legs 220, or trough attachment, of the spacers are then snapped into the trough 208 over tabs of the base unit to secure the grate in place with the bottom side of the spacer body resting against the a part or portion where trough becomes the drain flange or the membrane flange which sits flush against the base unit's flange 218. The particular spacers are chosen from those having a variety of different predetermined heights 224 to result in a grate that when installed has a top surface that is close to flush with the surrounding tile 20.

Of note, the waste water from the shower will enter the drain from both the top of the grate 212 as well as its sides. Since there is no drain body or sidewalls that are seated tightly against the surrounding edges of the tile 20 and mortar 22, there is no need for weep holes or other mechanisms to prevent the build up of water within the surrounding tiles. The extended membrane flange 206 in combination with the shower floor membrane 17 effectively ensures that water will not in the region surrounding the drain into or on the subfloor 24.

A Third Embodiment Elongated Shower Drain Assembly

Figure 22:
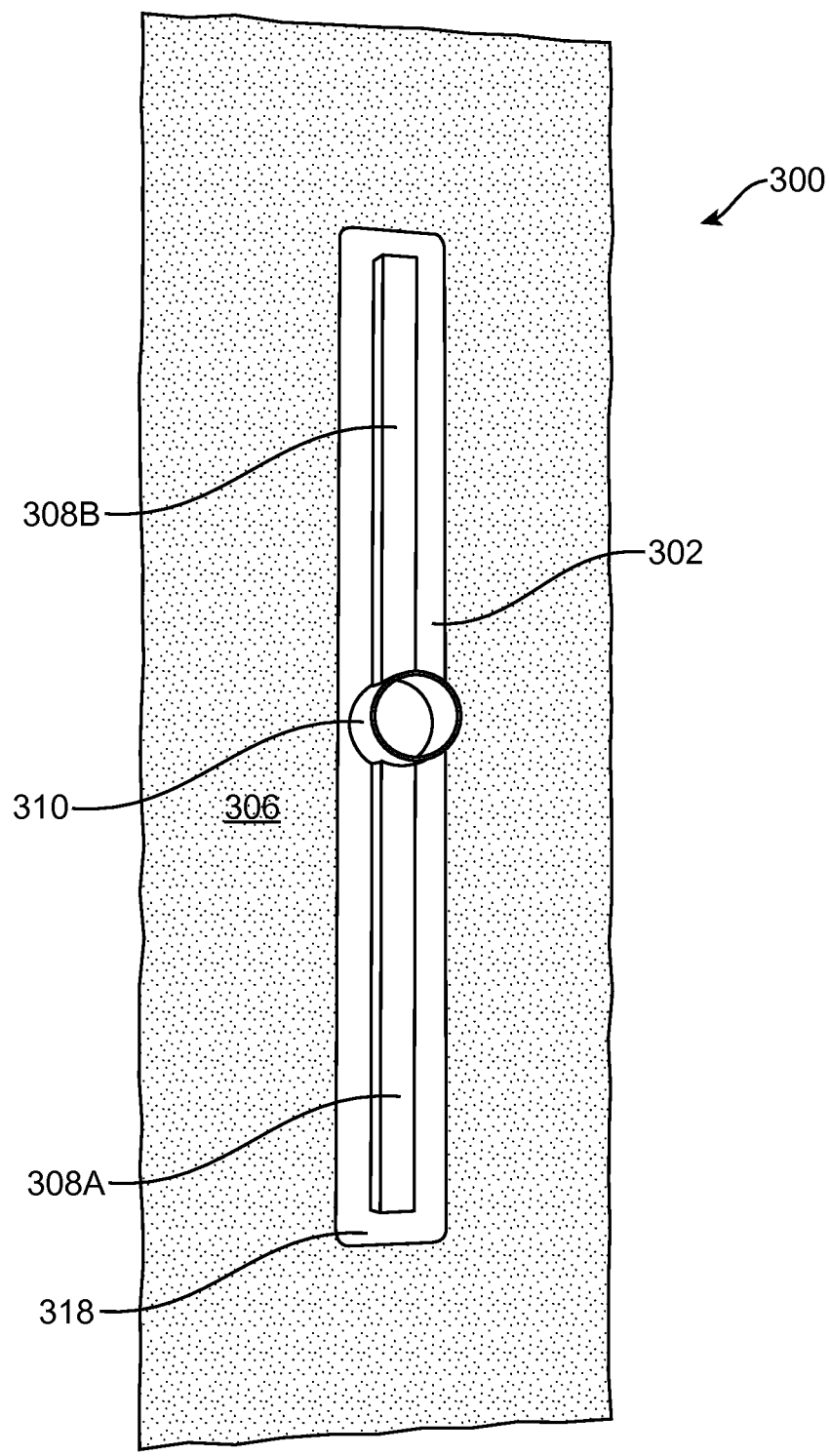
FIG. 22 is a bottom perspective view of a base unit with a waterproof membrane flange secured thereto according to an embodiment.
Figure 23:
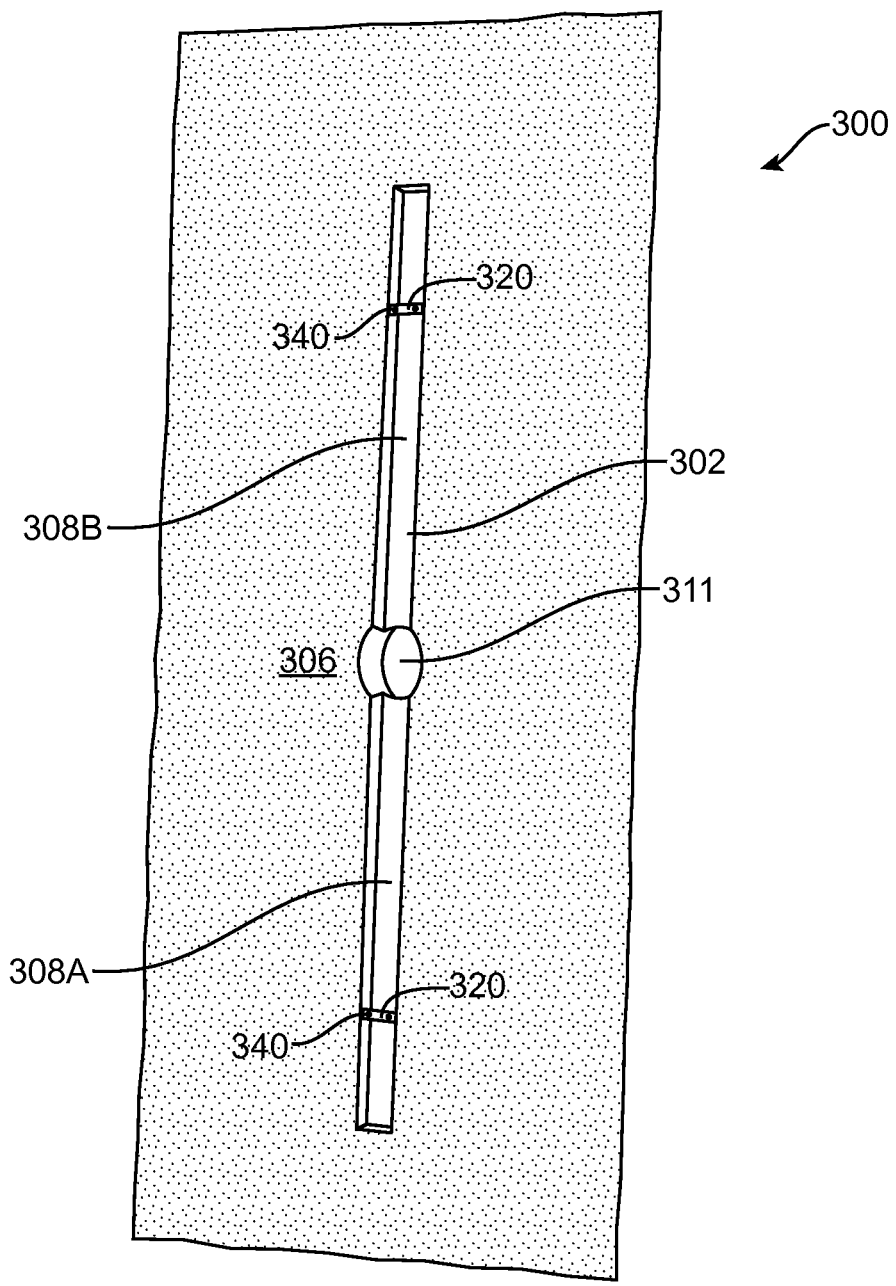
FIG. 23 is a top perspective view of a base unit with a waterproof membrane flange secured thereto according to an embodiment.

A third embodiment elongated shower drain assembly 300 is illustrated in FIGS. 22 & 23 with some of the various individual components of the assembly being illustrated in FIGS. 24-28 and 33-37. The third embodiment assembly typically comprises: (i) a base unit 302 that typically rests on the shower stall subfloor and couples with a drain pipe; (ii) a waterproof membrane flange 306 made from a waterproof membrane; (iii) a drain grate 312; and (iv) one or more spacers 304 to couple the grate with the base unit 302. In a variation of the third embodiment assembly, the drain grate 312 can be substituted for a V-shaped drain grate 412, and the one or more spacers 304 can be substituted for one or more adjustable spacers 404 or one or more fixed spacers 504.

Figure 24:
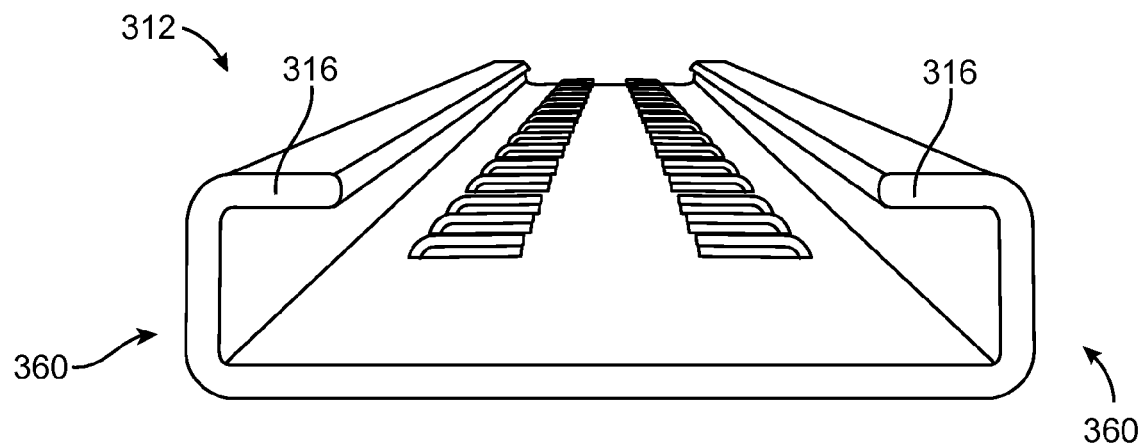
FIG. 24 is a side perspective view of a drain grate having U-shaped channels according to an embodiment.
Figure 25A:
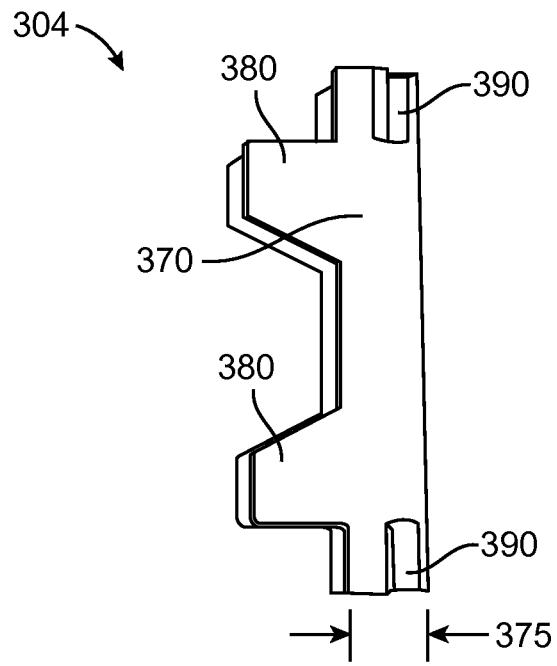
FIG. 25A&B is a perspective view of a spacer adapted for U-shaped channels according to an embodiment.
Figure 25B:
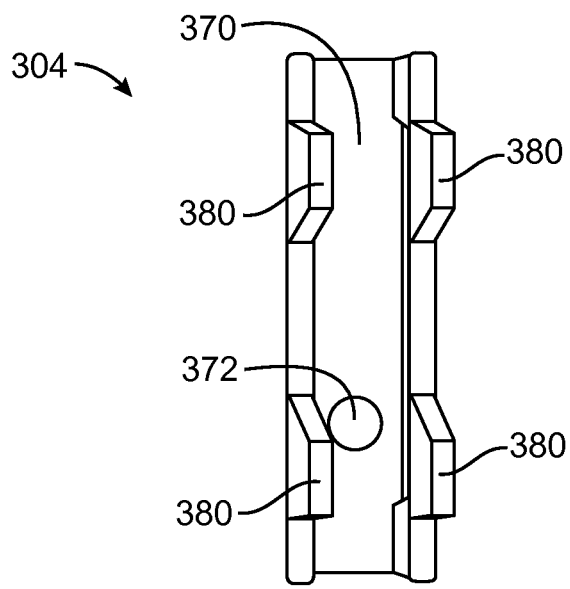
Figure 26:
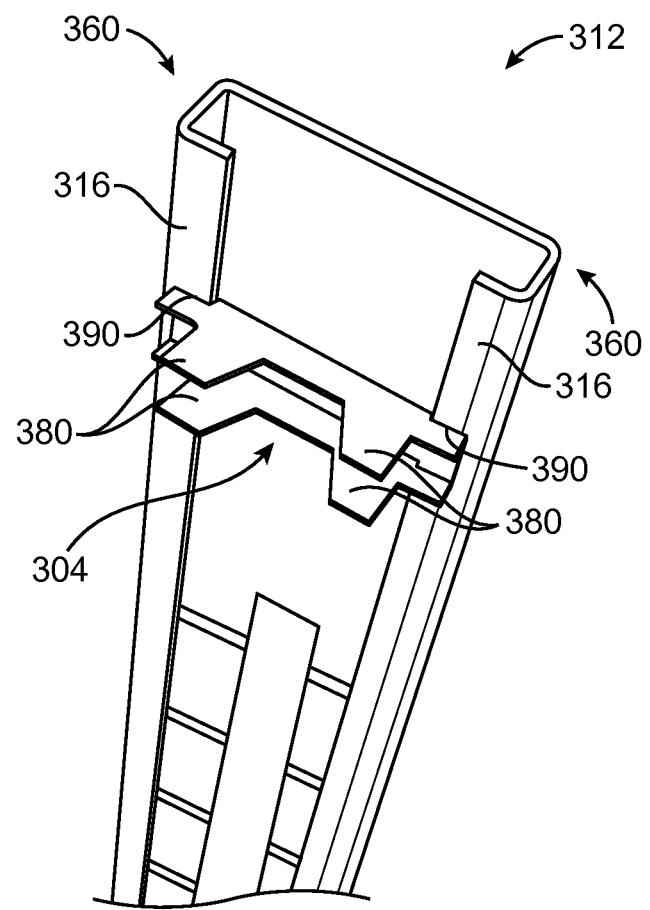
FIG. 26 is a perspective view of a spacer slidably coupled to a drain grate having U-shaped channels according to an embodiment.
Figure 27:
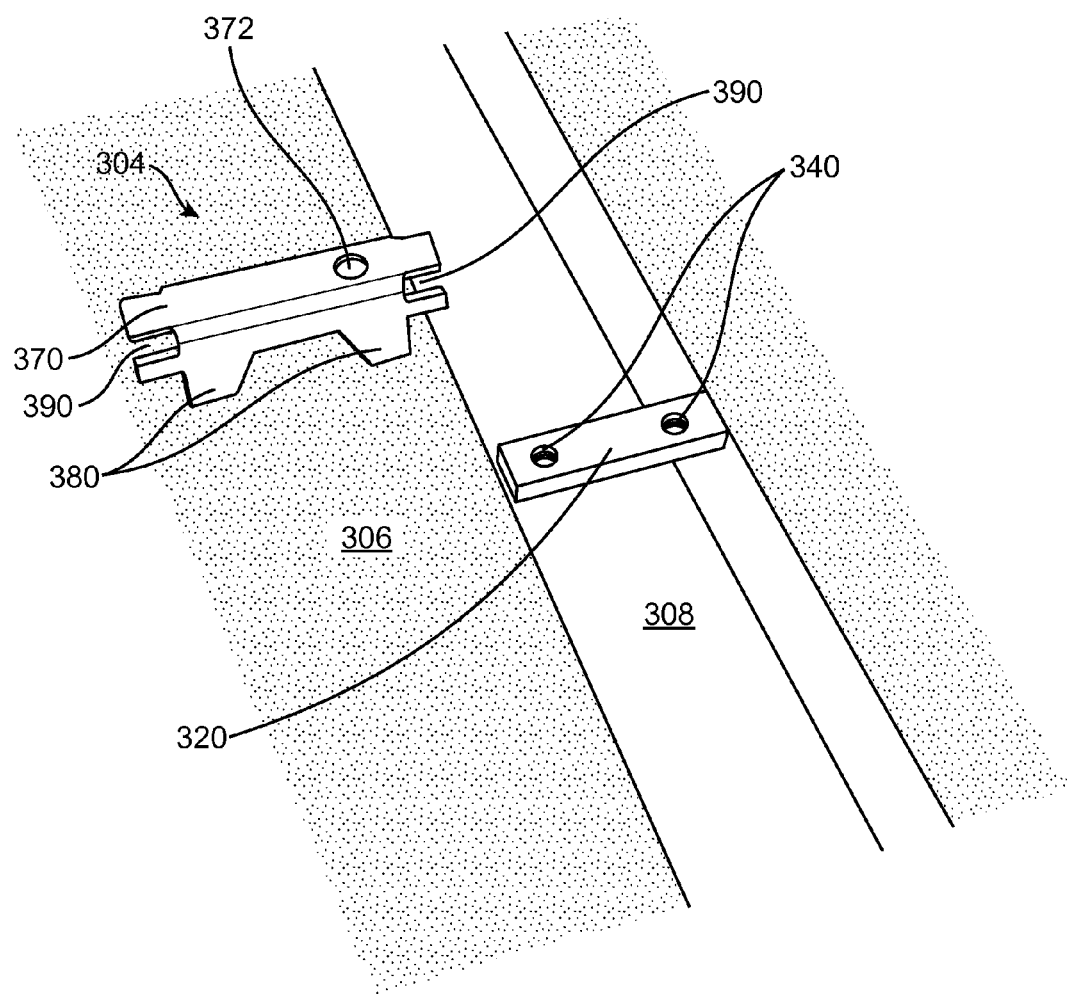
FIG. 27 is a close-up perspective view of a spacer and a cross member of a base unit according to an embodiment.
Figure 28:
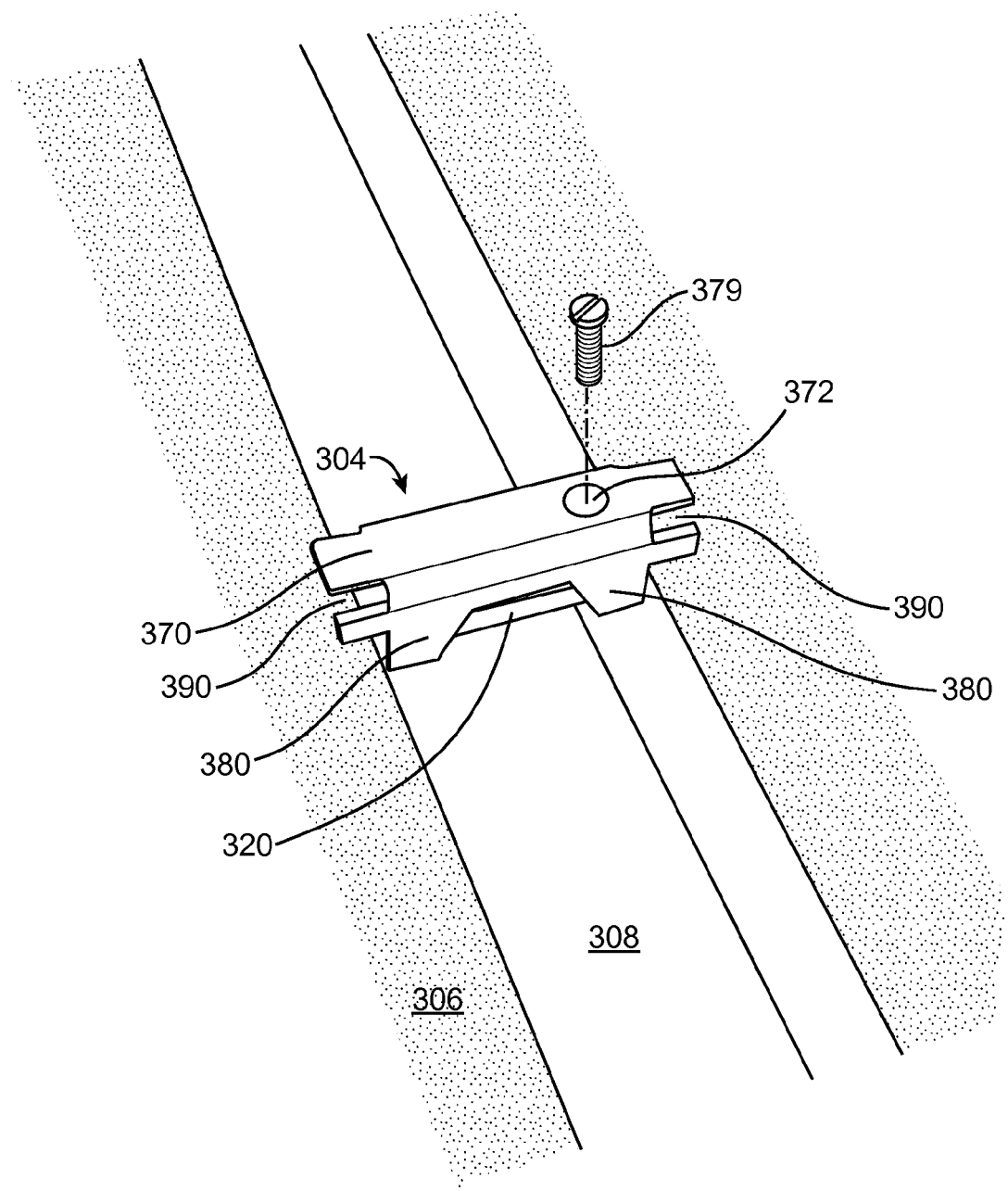
FIG. 28 is a close-up perspective view of a spacer substantially aligned with a cross member of a base unit according to an embodiment.

One embodiment of the base unit 302 as shown in FIGS. 23 & 24 is comprised of stainless steel although other variations can be fabricated from any suitable material including, but not limited to, PVC and ABS plastics. The stainless steel variation is typically fabricated from sheet stock that is cut and bent to shape and welded, soldered or adhesively joined and sealed at the various intersections of the formed plate. Alternatively, the base unit 302 can be formed using other known fabrication techniques or combinations of techniques. As can be appreciated ABS and PVC variations of the base unit are typically, but not necessary, unitarily molded.

The base unit 302 includes a trough 308. When the trough 308 is not disposed on an end of the base unit, the trough 308 comprises left and right portions 308A & 308B that slope gently towards the drain pipe connector 310 located generally proximal the center of the unit (typically 3" off center some models in the center) although the location in variations can vary substantially so long as the respective left and right portions are suitably sloped towards the connector. The width of the trough 308 can vary significantly but in one variation it is about 1.0" making an installed drain less visually obtrusive.

Since in at least one variation the outside diameter of the drain pipe connector 310 is typically smaller or the same size as a typical 2" drain pipe, a coupler (similar to the couple 29 used in context with the second embodiment elongated shower drain assembly 200) can be utilized to join the drain to the drain pipe. In some variations, the coupler can be straight facilitating the attachment of the drain pipe to the bottom of the drain. In other variations, a 90 degree elbow connector (not shown) can be provided that permits the drain to be coupled with side entry drain pipes.

As can be ascertained from the figures, the inside diameter of the pipe connector 310 in the illustrated embodiment is typically greater than the width of the trough 308. The pipe connector 310 where it interfaces and is connected to the trough 308 generally overlaps the sides of the trough 308. In at least one embodiment, the pipe connector can be formed at an end into a rectangle, typically 1.5" wide and 3" long, and such that no overhangs result thereby mitigating any infection control issues. The bottom of the waste pipe will be the same as it is now a standard 2" ID pipe. In such an embodiment, the bottom of the waste pipe/pipe connector will typically be a standard 2" ID pipe. An opening is formed through the trough's bottom surface and includes portions 311 that extend up the opposing side surfaces to permit a greater flow of waste water into the pipe connector 310. In one variation, the base unit comprises a plurality of openings each having a drain pipe connector 310 to further flow of waste water. Sections of the trough in such a variation would typically slope gently towards at least one of the drain pipe connectors 310 and each drain pipe connector 310 would be combined or aggregated together prior to being coupled to the main drain pipe.

A flange 318 of the base unit 302 extends around the perimeter of the trough 308 and is about 1.0" wide in some implementations. The flange 318 typically rests upon the surface of the shower subfloor when the third embodiment elongated shower drain assembly 300 is installed and provides physical support for the drain when installed. The drain is typically attached to the shower stall subfloor at the flange 318 typically either through the use of fasteners or adhesive bonding. Further, a top surface of the flange 318 provides a bonding surface for securing the extended the waterproof membrane flange 306 to the base unit 302.

The waterproof membrane flange 306 is best illustrated in FIGS. 22 & 23 can be generally rectangular. This rectangular membrane can comprise any suitable waterproof sheet material of the type commonly used in shower stall installations; however, a membrane that has an upwardly facing surface adapted to bond to thin set mortar, such as NobleSeal TS, is preferred in circumstances wherein no inner pan is to be used. The center of the waterproof membrane flange 306 comprises a rectangular opening or slot generally corresponding to the size of the trough opening. Typically two parallel beads of adhesive sealant, such as Noblesealant 150, are applied to the flange 318 of the base unit 302 set back from the edge thereof about 0.25"-0.50" and the waterproof membrane flange 306 is pressed into the sealant to affix it in place.

With generally reference FIG. 19 relating to the second embodiment elongated shower drain assembly 200, a method to install a third embodiment elongated shower drain assembly 300 can be described. To install a drain in a shower stall having a plywood, OSB or other wood subfloor, the length of the floor proximate the desired installation location is measured. A third embodiment elongated shower drain assembly 300 is selected whose length is less than but at preferably close to the measured length. Unlike the first embodiment, the third embodiment is typically not length adjustable and as such the proper length assembly must be selected prior to installation. Accordingly in some installations, it may be necessary to slope short distances of floor tiles and/or portions of the shower pan located at either end of the drain towards the drain slightly.

Next, optionally using a template provided with the drain assembly, an elongated opening is cut to receive the drain therein. This differs from the first embodiment drain in that the trough 308 is located substantially below the surface of the subfloor. As an example, for a variation of the drain base unit 302 having a 1.0" wide trough and a 3.0" wide width from the opposing longitudinal edges of the flange 318 of the base unit 302, an about 1.75" wide opening will be cut at a length 1-2" less than the length of the base unit 302. As can be appreciated, additional material may need to be cut out of the floor proximate the location of the pipe connector 310 to accommodate its large diameter. Furthermore, if a side discharge coupler is being utilized, an additional cutout may be required to permit proper attachment of the drain assembly to the drain pipe. The base unit 302 with the waterproof membrane flange 306 attached thereto is then placed within the elongated opening and the unit's pipe connector 310 is secured to the household drain pipe typically using an appropriate coupler.

Next, the shower stall floor is sloped towards the drain, typically about 2%. This can be accomplished using a dry pack that is extended up to an edge of the base unit 302 or since the slope is simple proceeding in a single direction, appropriately tapered plywood, OSB or backer board sheet(s) can be laid down and secured in place. In one variation, a sloped sheet of high density foam and/or a honeycomb panel can be utilized. The high density foam and/or a honeycomb panel can be bought in a pre-sloped form and is cut as necessary to match the dimensions of the shower stall. If tapered sheet stock is utilized it is typically adhesively and/or mechanically fastened to the underlying subfloor.

The waterproof membrane flange 306 can then be unrolled and secured to the sloped floor using a thin-set mortar or other suitable adhesive, such as but not limited to NobleBond EXT. Since one longitudinal side and both end sides abut the walls of the shower stall, the waterproof membrane flange 306 can be secured to the framing typically using staples or nails. Using procedures well known in the industry for shower pan membranes, the waterproof membrane flange 306 can be folded as necessary to secure and fasten it into the corner wall intersections of the stall. Typically, it is advisable to mechanically fasten the waterproof membrane flange 306 to the wall at a distance of at least 2" above the surface of the floor.

Thin-set mortar or other suitable adhesive is applied to the entirety of the sloped floor including the portion of the waterproof membrane flange 306 that has been secured to the floor but leaving the waterproof membrane flange 306 thin-set free about 1" from the edge of the trough opening. Along this 1" edge two parallel beads of an appropriate flexible sealant are applied. An appropriate membrane, such as NobleSeal TS, can placed over the sloped floor and secured in place by pressing it into the mortar and the beads of sealant. The edges of the waterproof membrane flange 306 can then be secured to the wall studs using well known practices. Finally, tiles can be set in place directly over the waterproof membrane flange 306 using a thin-set mortar. Further, as applicable, the walls of the stall are also tiled typically over drywall or backer board that has been previously secured to the wall studs.

The drain grate 312, best illustrated in FIG. 24, is substantially similar to the grate described above with reference to the first and second embodiments. In addition to a perforated top surface, it includes two generally vertically orientated downwardly extending sides that each intersect with an in-turned generally horizontal lip 316. The drain grate 312, which basically serve as a cover for the third embodiment elongated shower drain assembly 300 is also typically comprised of stainless steel although other materials can be used as well. Of specific note, the lengthwise or longitudinal edges of the drain grate 312 are bent over to form U-shaped channels 360 that face each other. These U-shaped channels 360 are used to receive and hold spacers that are utilized to secure the drain grate 312 to the drain body/base unit 302 as will become more apparent herein below. In the embodiment comprising the 1" wide trough, the drain grate 312 is typically about 2" wide with a length that is as long or slightly longer than that of the trough 308.

The drain grate 312 is secured to the base unit 302 by way of one or more spacers 304 as illustrated in FIGS. 25 through 28. Each spacer 304 includes a set of legs 380, typically but not necessarily four legs, that when the spacer is installed rest adjacent or around a cross member 320 of the base unit 302 (see FIGS. 27 & 28 for close-up perspective views). The body 370 of each spacer 304 is typically generally rectangular in shape is also typically comprised of a stainless steel material, but other materials can also be used. Also of note, each spacer 304 includes a slot 390 at each of its ends. These slots 390 are received into the in-turned generally horizontal lip 316 on the U-shaped channels 360 of the drain grate 312 to unite the spacers 304 to the drain grate 312.

In order to appropriately position the spacers 304 along the length of the drain grate 312, the spacers 304 are typically slidably coupled to the drain grate 312 via the slots 390 of the spacers 304 and the in-turned generally horizontal lips 316 of the drain grate 312. Finally, each spacer 304 includes one or more holes 372 along a generally flat top portion of the body 370. The one or more holes 372 are adapted to receive at least one fastener. Typically the fastener is a threaded fastener 379 that is also threadably received into a threaded hole 340 of the cross member 320 to secure the spacer 304 to the base unit 302. When installed, the generally flat top portion of the body 370 of the spacer 304 faces the drain grate 312 and is disposed between the U-shaped channels 360 thereof. Consequently, the set of legs 380 of the spacer 304 are disposed toward the though 308 of the base unit 302 typically adjacent and around the cross member 320 thereby basically interlocking with the cross member 320 and preventing the spacer 304 from sliding longitudinally along the length of the trough 308.

Spacers 304 having different body height dimensions 375 can be used with a base unit 302 and its drain grate 312 to adjust for the thicknesses of the shower pan (when used) and tile being used in a particular installation. Spacers 304 are typically available in a number of different heights to account for different overall thickness of tiled shower floor installation. Accordingly, by picking the correct spacers, an installer can ensure that the top surface of the drain cover is flush or close thereto with the surface of the adjacent shower floor.

A Variation of the Third Embodiment Elongated Shower Drain Assembly including a V-shaped Drain Grate and Adjustable Spacer A variation of the third embodiment elongated shower drain assembly 300 is illustrated with respect to FIGS. 22 & 23 and various individual components being illustrated in FIGS. 33 through 37. As described earlier, the drain grate 312 can be substituted for the V-shaped drain grate 412, and the one or more spacers 304 can be substituted for the one or more adjustable spacers 404 in a variation of the third embodiment assembly. The remaining components typically included in the third embodiment elongated shower drain assembly 300 (e.g., the base unit 302 and the waterproof membrane flange 306) remain substantially similar a variation of the third embodiment assembly.

One notably difference that typically exists is that base unit 302 can have a generally rounded lip along portions of the flange 318 proximal the rectangular opening or slot of the trough opening. This difference typically occurs when the base unit 302 is constructed by stamping means thereby making certain edges generally rounded or arcuate. In some implementations of the base unit 302, construction by stamping means can result in substantial manufacturing cost savings.

Figure 33A:
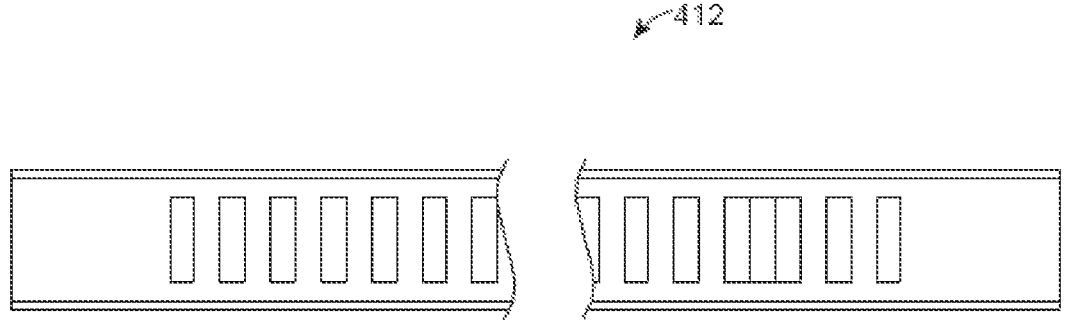
FIG. 33A&B are plan views of a V-shaped drain grate having V-shaped channels according to an embodiment.
Figure 33B:
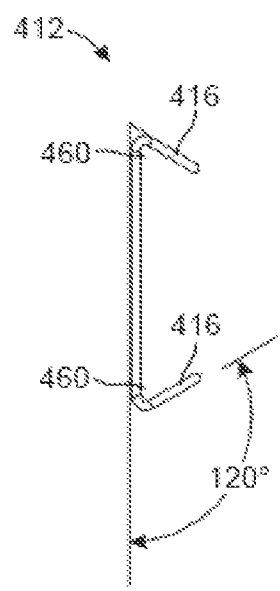
Figure 34A:
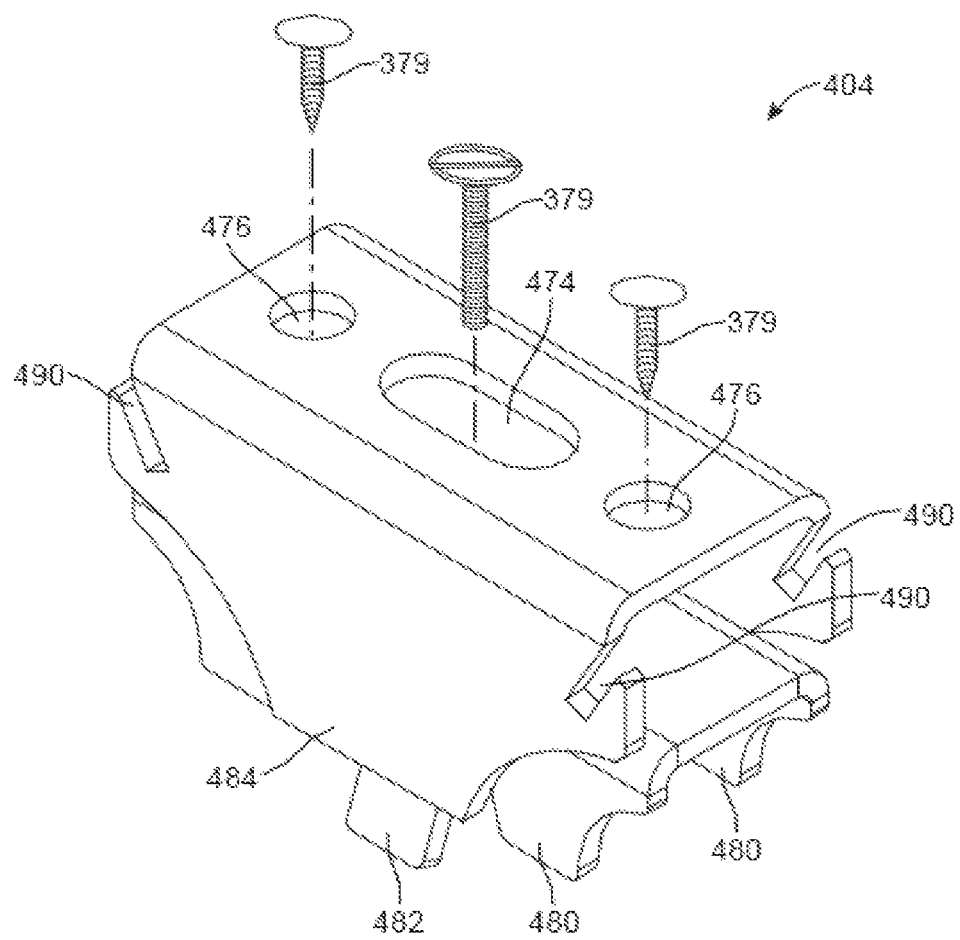
FIG. 34A,B,C&D are perspective and plan views of an adjustable spacer according to an embodiment.
Figure 34B:
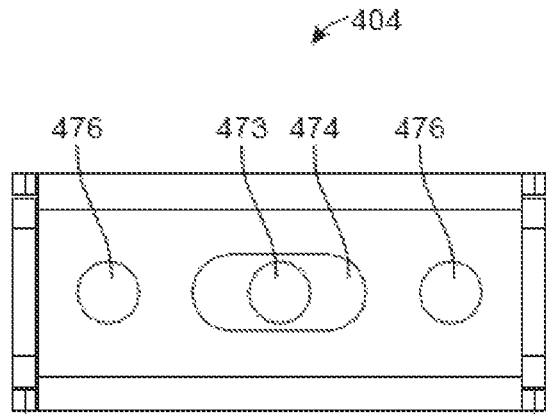
Figure 34C:
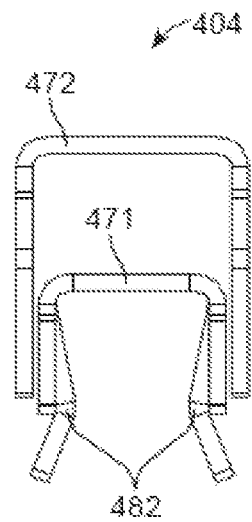
Figure 34D:
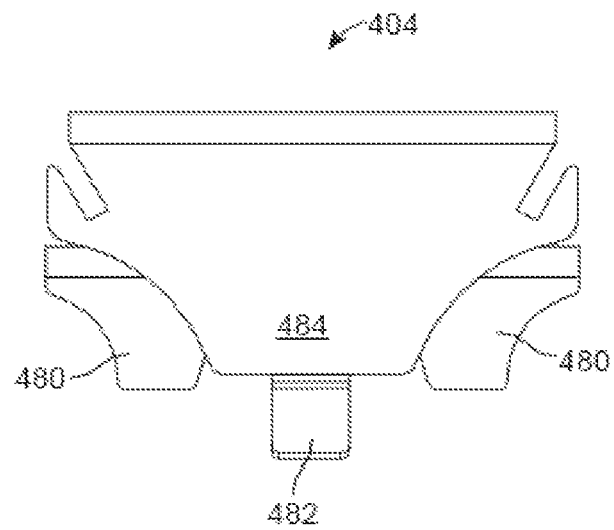

The V-shaped drain grate 412, best illustrated in FIG. 33. A perforated top surface of the V-shaped drain grate 412 is substantially similar to like top surfaces described above with reference to the drain grates used in the first, second, and third embodiments. However, unlike the other drain grates, the V-shaped drain grate 412 includes two generally inwardly angled lips 416. The V-shaped drain grate 412, which basically still serve as a cover for the third embodiment elongated shower drain assembly 300 is also typically comprised of stainless steel although other materials can be used as well. Of specific note, the lengthwise or longitudinal edges of the V-shaped drain grate 412 are bent over to form V-shaped channels 460. The openings of the V-shaped channels 460 generally face each other whereby if the two generally inwardly angled lips 416 were to be extended, they would eventually intersect each other (see FIG. 33B). An angle of the inwardly angled lip can be any degree angle from 1 degree to 89 degrees depending on the specific implementation, but more typically is an angle between 15 degrees and 75 degrees. However, in at least one implementation, the angle of the inwardly angled lip is 60 degrees inward facing, or stated another way angled 120 degree from the horizontal plane of the perforated top surface (see FIG. 33B). Outwardly facing angles are contemplated in other embodiments as well.

These V-shaped channels 460 are used to receive and hold spacers that are utilized to secure the drain grate 402 to the drain body/base unit 302 as will become more apparent herein below. In the embodiment comprising the 1" wide trough, the V-shaped drain grate 412 is typically about 2" wide with a length that is as long or slightly longer than that of the trough 308.

An advantage of utilizing the V-shaped drain grate 412 instead of the drain grate 312 having U-shaped channels 360 or the like is that any type of deposit or build-up such as but not limited to dirt, grime, hair, and soap scum that may occur during use of the drain is significantly or altogether avoided with the V-shaped channels 460. Drain grate 312 having U-shaped channels 360 or the like may tend to collect such deposits or build-ups during use of the drain as such substances may catch on the in-turned generally horizontal lips 316. Thus, in some implementations of the drain grate 312, the in-turned generally horizontal lips 316 can be replaces with generally inwardly angled lips, like the generally inwardly angled lips 416 of the V-shaped drain grate 412.

The V-shaped drain grate 412 can be secured to the base unit 302 by way of one or more adjustable spacers 404 as illustrated in FIGS. 34 through 36. Each adjustable spacer 404 typically comprises two body members: a first body member 471 and a second body member 472. The first and second body members 471, 472 of each adjustable spacer 404 is typically generally rectangular in shape and is also typically comprised of a stainless steel material, but other materials can also be used. In use, the second body member 472 is placed over top of the first body member 471.

The first body member 471 includes a set of legs 480, typically but not necessarily four legs, and a pair of clasp legs 482. When the adjustable spacer 404 is installed, the set of legs 480 generally rest adjacent to or around the cross member 320 of the base unit 302. Additionally, a side of each leg 480 can include a curved or arcuate shaped portion to better receive the generally rounded lip of the flange 318. The adjacent surfaces are generally matched to produce a snug fit between the first body member 471 and the generally rounded lip of the flange 318 as the adjustable spacer 404 rests on the base unit 302.

Figure 35A:
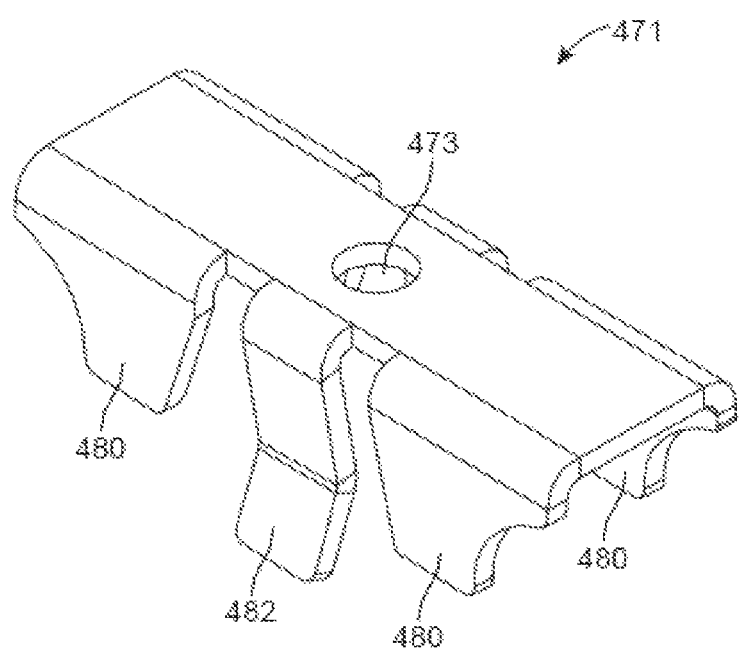
FIG. 35A,B,C&D are perspective and plan views of a first body member of an adjustable according to an embodiment.
Figure 35B:
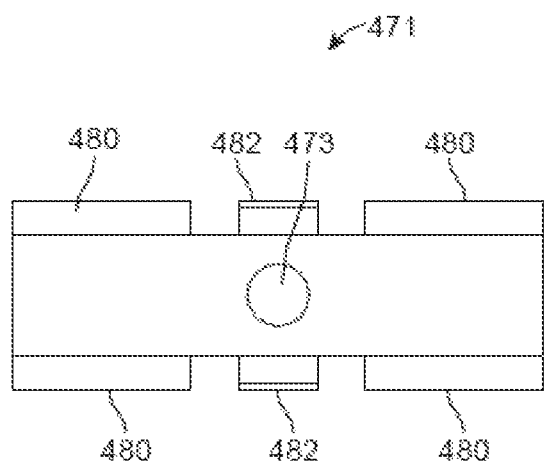
Figure 35C:
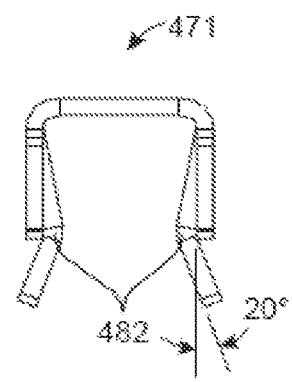
Figure 35D:
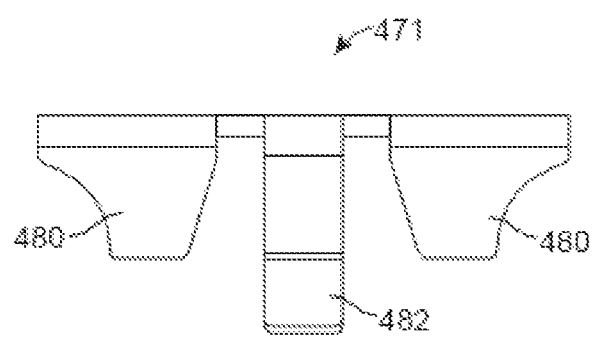
Figure 36A:
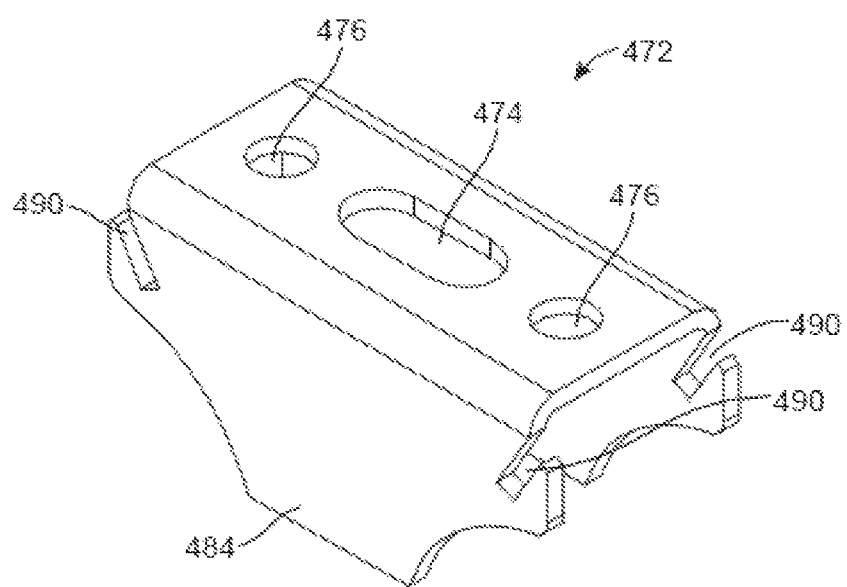
FIG. 36A,B,C&D are perspective and plan views of a second body member of an adjustable according to an embodiment.
Figure 36B:
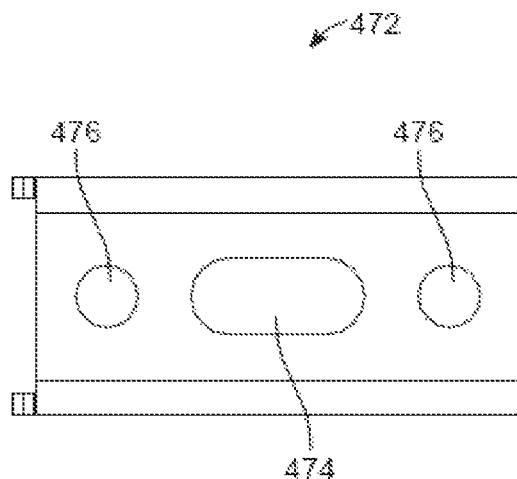
Figure 36C:
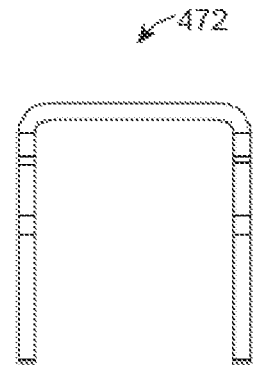
Figure 36D:
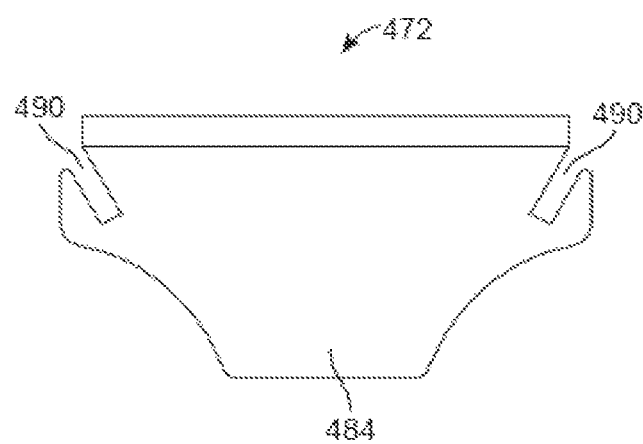
Figure 37A:
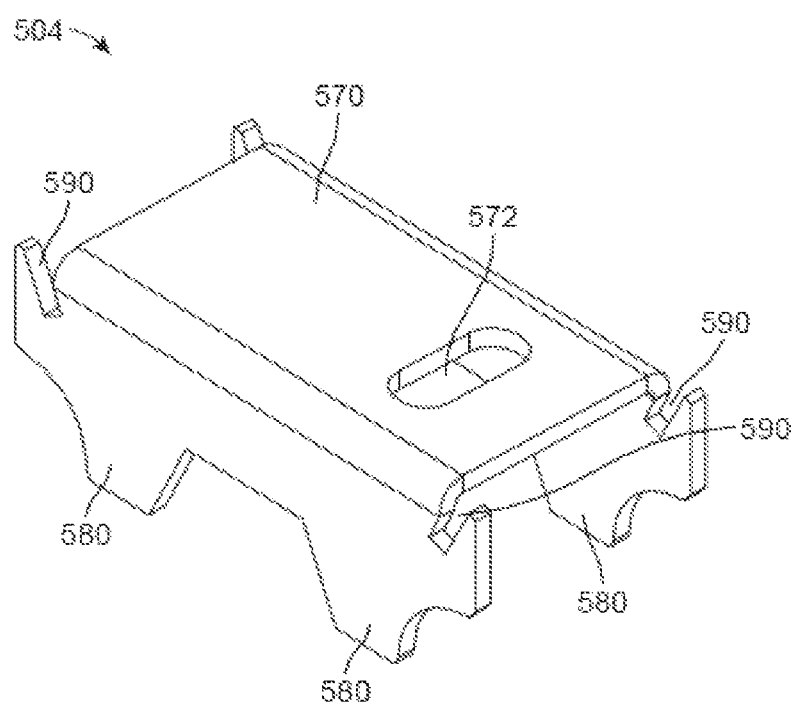
FIG. 37A,B,C&D are perspective and plan views of a fixed spacer according to an embodiment.
Figure 37B:
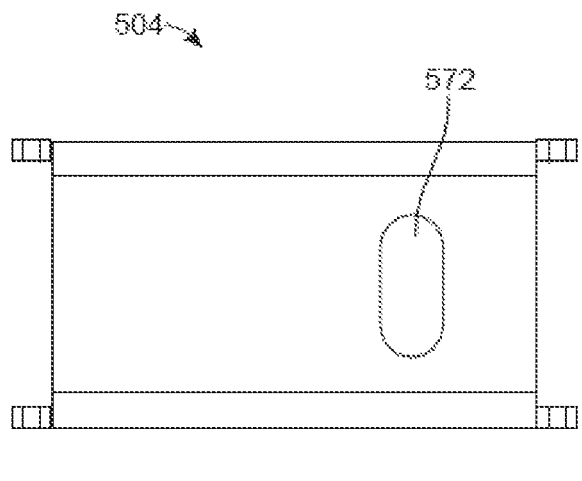
Figure 37C:
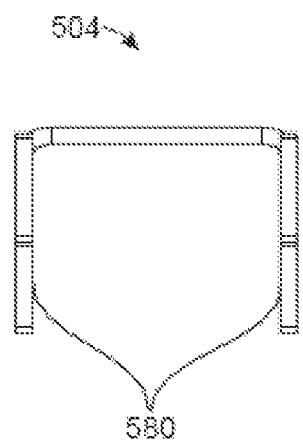
Figure 37D:
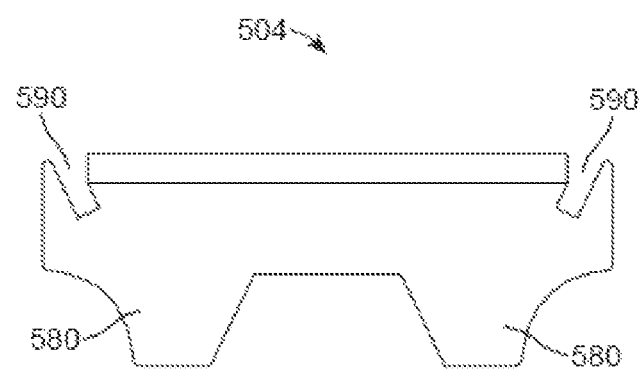

Each clasp leg 482 includes a top portion and a bottom portion disposed generally non-vertical manner (e.g., a 20 degree offset from vertical for each portion) in order to create a slightly bellowed configuration as can be seen in FIG. 35C. The slightly bellowed configuration is oriented such the narrowest point between the pair of clasp legs 482 is the intersection of the top and bottom portions of the each facing/opposing clasp leg 482. Hence, the pair of clasp legs 482 create a snapping or biasing mechanism that can be securely coupled to the cross member 320 of the base unit 302. Typically, the pair of clasp legs 482 is comprised of stainless steel having strong biasing characteristics. This structure obviates the need to use fasteners such as screws to connect the spacer to the cross member of the base unit.

It is to be appreciated that in some implementations of the adjustable spacer, more than one pair of clasp legs can be included and oriented in any appropriate manner. Moreover, other implementations of the adjustable spacer can comprise various types of clasping sections adapted to substantially couple via a snapping or biasing force to the cross member of the base unit.

Finally, the first body member 471 of each adjustable spacer 404 includes a first body hole 473 along a generally flat top portion of the first body member 471. The first body hole 473 is used to couple the first body member 471 and second body member 472 together.

The second body member 472 includes a pair of legs 484 and an angled slot 490 at each of its ends. When the second body member 472 is placed on top of the first body member 471, the pair of legs 484 on the second body member 472 surrounds at least a portion of the set of legs 480 and the pair of clasp legs 482 of the first body member 471.

The angled slots 490 are received into the generally inwardly angled lips 416 of the V-shaped channels 460 of the V-shaped drain grate 412 to unite the adjustable spacers 404 to the V-shaped drain grate 412.

In order to appropriately position the adjustable spacers 404 along the length of the V-shaped drain grate 412, the adjustable spacers 404 are typically slidably coupled to the V-shaped drain grate 412 via the angled slots 490 of the adjustable spacers 404 and the generally inwardly angled lips 416 of the V-shaped channels 460 of the V-shaped drain grate 412. An extended hole 474 is included along a generally flat top portion of the second body member 472. The extended hole 474 of second body member 472 is generally aligned above the first body hole 473 of the first body member 471.

Additionally, the second body member 472 includes one or more adjustment holes 476 along the generally flat top portion of the second body member 472. The one or more adjustment holes 476 are adapted to receive at least one fastener. Typically, each of the adjustment holes 476 is a threaded hole and the fastener used therewith is a threaded fastener 379.

Various exemplary adjustments to the coupling and positioning of the V-shaped drain grate 412 and the base unit 302 utilizing one or more adjustable spacers 404 can now be described in detail. It is to be appreciated that while adjustments can be made adjustable spacers 404, the adjustable spacers 404 can have different body height dimensions to be used in different implementation with a base unit 302 and its V-shaped drain grate 412 to accommodate for larger thicknesses of the shower pan (when used) and tile being used in a particular installation. Hence, the adjustable spacers 404 are typically available in a number of different heights to account for different overall thickness of tiled shower floor installation, but each of the adjustable spacers 404 still able to further adjust positioning and placement of the V-shaped drain grate 412 within certain tolerances.

For each adjustable spacer 404 used, the following operations can be performed (not necessarily in the order provided). The first body member 471 can be coupled to a cross member 320 of the base unit 302 by placing the first body member 471 of the cross member 320 and pushing the first body member 471 until the pair of clasp legs 482 engages with or snaps onto the cross member 320. The set of legs 480 are typically now generally adjacent to or around the cross member 320 and curved or arcuate shaped portion of each leg 480 received by the generally rounded lip of the flange 318. Thus, the first body member 471 is securely coupled to the cross member 320. If more than one adjustable spacer 404 is being used, which is typically the case, the above operation can be repeated with the first body member 471 of the next adjustable spacer 404.

Next, the second body member 472 can be coupled to the V-shaped drain grate 412 by sliding the angled slots 490 into the generally inwardly angled lips 416 of the V-shaped channels 460 of the V-shaped drain grate 412. The second body member 472 is positioned along the length of the V-shaped drain grate 412 such that it will be directly over the first body member 471 and engage over the top therewith. A threaded fastener 379 can be inserted into each of the one or more adjustment holes 476. By varying the amount of turns of the threaded fastener, a distance between a tip if the threaded fastener 379 being in contact with the generally flat top portion of the first body member 471 and a threaded portion of the one or more adjustment holes 476 can be finely adjusted up or down. Hence, an installer can precisely vary the height vertically of the V-shaped drain grate 412 with respect to the tile installed on the shower floor. Moreover, with two adjustment holes 476 disposed on each end of the second body member 472 minor planar adjustments of the V-shaped drain grate 412 can be made in necessary; for instance, if the shower floor is slight slanted leading to the grate, the V-shaped drain grate 412 can be similarly slanted by having a slightly different distance for one of the threaded fasteners 379 in one of the adjustment hole 476 than the distance for the other of the threaded fasteners 379 in the other adjustment hole 476.

Next, the first body member 471 and second body member 472 can be securely coupled together. However, it is to be appreciated that in some implements, the first body member 471 and second body member 472 are coupled together and assembled first and then the adjustable spacers 405 slidably engaged with the V-shaped drain grate 412.

A threaded fastener 379 can be inserted through the extended hole 474 of the second body member 472 through the first body hole 473 in the first body member 471. It is pertinent to note that the use and orientation of an elongated hole 474 on the second body member 472 enables adjustment of the V-shaped drain grate 412 laterally or horizontally with respect to the shower floor. This horizontal or latitudinal adjustment again enables an installer to precisely vary the location horizontally of the V-shaped drain grate 412 with respect to the tile installed on the shower floor.

Thus, the use of the one or more adjustable spacers 404 enables various adjustments (typically micro-adjustment, but can be more substantial in some implements) to the placement of the V-shaped drain grate 412 when coupling to the base unit 302. It is to be appreciated that these various adjustments provide an enormous benefit to the installation technician by enabling modifications to the placement of the V-shaped drain grate 412 to accommodate the slight variances or imperfections that inevitably occur during the installation process. Accordingly, the result of using the one or more adjustable spacers 404 is a substantially or near perfectly placed the V-shaped drain grate 412 despite the slight variances or imperfections in height or dimensions of the tapered plywood, OSB, backer board sheet(s), high density foam, chalking material, tile and/or other material used during the installation process affecting the overall thickness of tiled shower floor installation.

Alternatively, a spacer 504 adapted to couple with the V-shaped drain grate 412 can be utilized as illustrated in FIG. 37. Each of the one or more spacers 504 includes a set of legs 580, typically but not necessarily four legs, that when the spacer is installed rest adjacent or around the cross member 320 of the base unit 302. The body 570 of each spacer 504 is typically generally rectangular in shape is also typically comprised of a stainless steel material, but other materials can also be used. Also of note, each spacer 504 includes an angled slot 590 at each of its ends. These angled slots 590 are received into the generally inwardly angled lips 416 of the V-shaped channels 460 of the V-shaped drain grate 412 to unite the spacers 504 to the V-shaped drain grate 412.

Each spacer 504 includes one or more extended holes 572 along a generally flat top portion of the body 570. The one or more extended holes 572 are adapted to receive at least one fastener. Typically the fastener is a threaded fastener that is also threadably received into a threaded hole 340 of the cross member 320 to secure the spacer 504 to the base unit 302. When installed, the generally flat top portion of the body 570 of the spacer 504 faces the V-shaped drain grate 412 and is disposed between the V-shaped channels 460 thereof. Consequently, the set of legs 580 of the spacer 504 are disposed toward the though 308 of the base unit 302 typically adjacent and around the cross member 320 thereby basically interlocking with the cross member 320 and preventing the spacer 504 from sliding longitudinally along the length of the trough 308. Additionally, a side of each leg 580 can include a curved or arcuate shaped portion to better receive the generally rounded lip of the flange 318. The adjacent surfaces are generally matched to produce a snug fit between the spacer 504 and the generally rounded lip of the flange 318 as the spacer 504 rests on the base unit 302.

Spacers 504 having different body height dimensions can be used with a base unit 302 and its V-shaped drain grate 412 to adjust for the thicknesses of the shower pan (when used) and tile being used in a particular installation. Spacers 504 adapted to couple with the V-shaped drain grate 412 are typically available in a number of different heights to account for different overall thickness of tiled shower floor installation. Accordingly, by picking the correct spacers, an installer can ensure that the top surface of the drain cover is flush or close thereto with the surface of the adjacent shower floor.

A Variation of the Third Embodiment Elongated Shower Drain Assembly including Vertical Flanges for Installation of a Shower Door Another variation of the third embodiment elongated shower drain assembly 300 enabling the installation of a shower door is illustrated with respect to FIGS. 29 through 32. Modifications to accommodate the installation of the shower door with a matched elongated shower drain assembly generally comprise modifications to the base unit 302. Hence, either a drain grate 312 or V-shaped drain grate 412 can be used in the following variation described.

Figure 29:
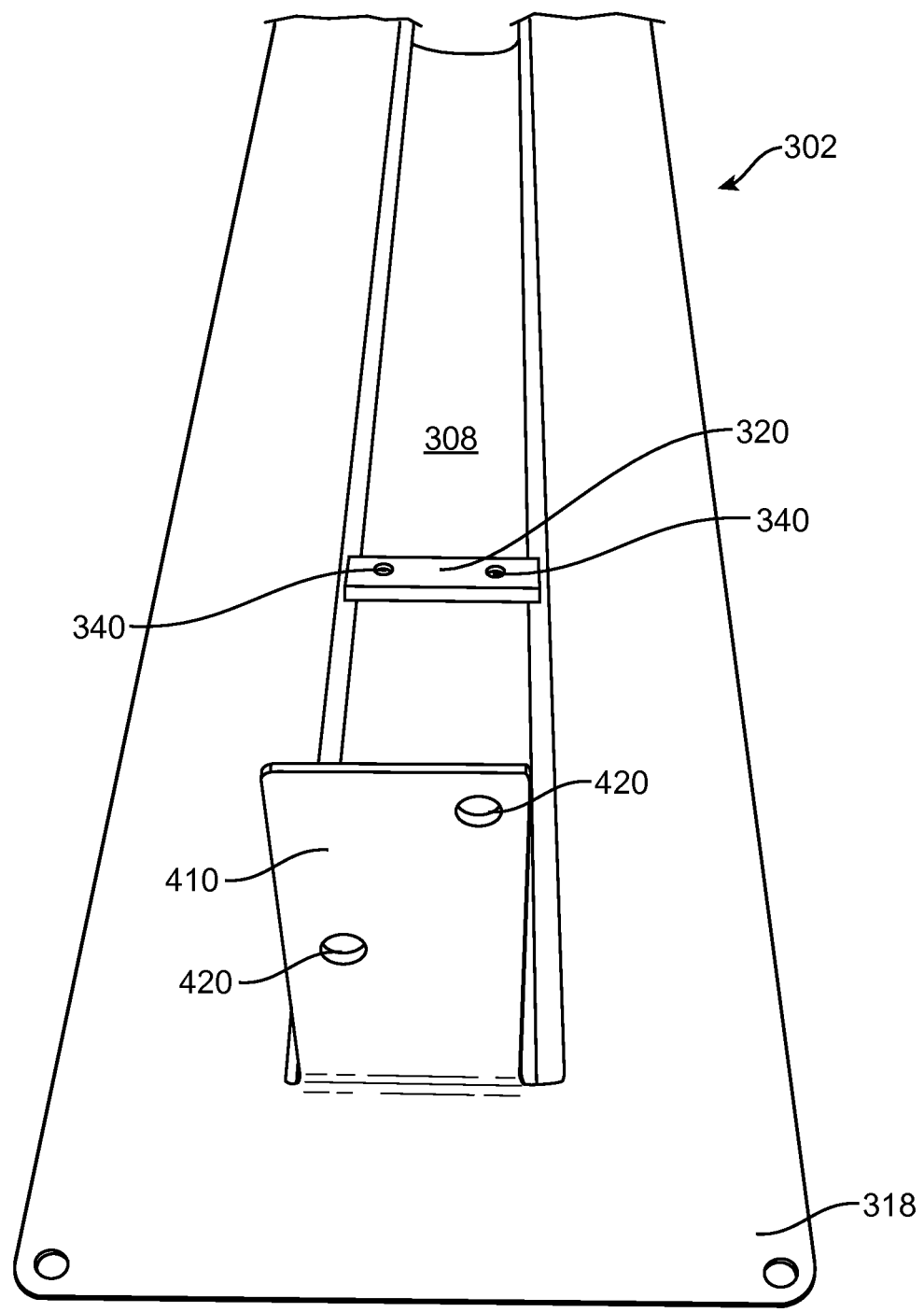
FIG. 29 is a perspective view of a base unit with a vertically extending flange according to an embodiment.

FIG. 29 illustrates an end of a base unit 302 of the third embodiment elongated shower drain assembly 300. A vertically extending flange 410 includes one or more openings 420 distributed thereon. The vertically extending flange 410 is typically welded to base unit 302 although in variations it can be attached by other means or stamping means in conjunction with the entire base unit 302. The vertically extending flange 410 is typically used to connect the base unit 302 to one of the vertical sides of a shower door frame 430 (see FIGS. 31 & 32). As can be appreciated, although not shown, the other end of base unit 302 can also include a similar vertically extending flange. Additionally, either the drain grate 312 or V-shaped drain grate 412 can be coupled to the cross member 320 of the base unit 302 as previously described herein.

Figure 30:
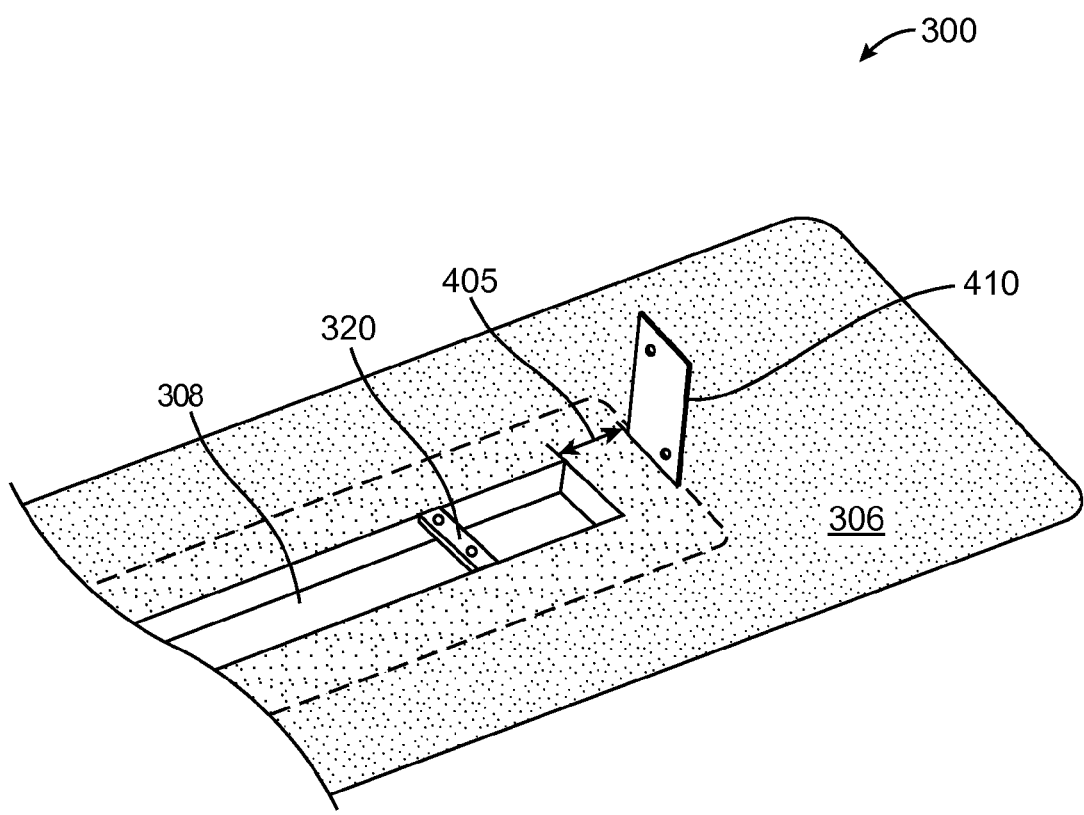
FIG. 30 is a perspective view of a base unit with a vertically extending flange and a waterproof membrane flange secured thereto according to an embodiment.
Figure 31:
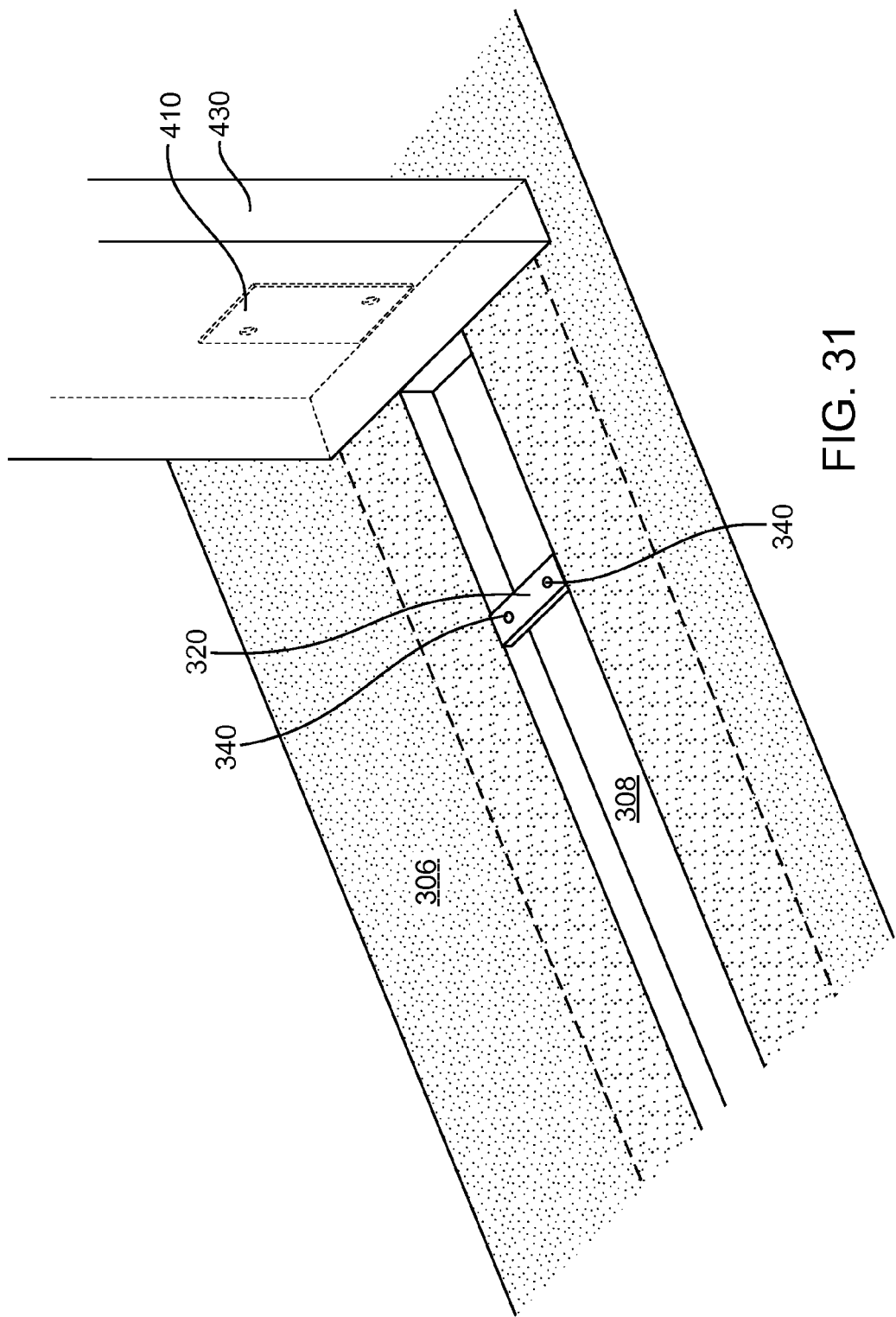
FIG. 31 is a perspective view of a base unit with a vertically extending flange coupled to a shower door frame and a waterproof membrane flange secured thereto according to an embodiment.

FIG. 30 illustrates the third embodiment elongated shower drain assembly 300 with the vertically extending flange 410. A distance 405 from the vertically extending flange 410 to an edge of the trough 308 provides space for the vertical side of the shower door frame 430. The vertically extending flange 410 typically extends through the waterproof membrane flange 306. As illustrated in FIG. 31, a vertical side of the shower door frame 430 is received over the base unit 302 and associated waterproof membrane flange 306 as well as in front of the vertically extending flange 410.

The shower door frame 430 can be coupled to the vertically extending flange 410 in any number of ways. For example, the shower door frame 430 can be coupled to the vertically extending flange 410 via fasteners through the one or more openings 420, rivets or glue; however, other suitable methods for coupling are contemplated. It is to be appreciated that the manner in which the vertically extending flange 410 couples to the frame can vary as would be apparent to one of ordinary skill given the benefit of this disclosure. Further, it is understood that in some alternative embodiments and variations, the vertically extending flange 410 or attachment member may look substantially different than is illustrated herein. Suffice it to say that any flange or member that can couple the base unit 302 to the shower door frame 340 is contemplated.

In at least one embodiment, the placement of the trough 308 of the base unit 302 should be directly or substantially directly under the door 450 (see FIG. 32) or where the door would reside once installed and in a closed configuration. Typically, if the door 450 where closed, the drain grate 312 or V-shaped drain grate 412 would not be visible from the outside (presuming of course that the door is not glass or otherwise transparent).

In some implementations, the vertically extending flange 410 is 1" wide by 2" tall. However, various sizes and shapes of the vertically extending flange 410 are contemplated to accommodate various installations. Moreover, the distance 405 can similarly be any distance suitable for the particular installation, however, is typically between 0" to 2.5".

Figure 32:
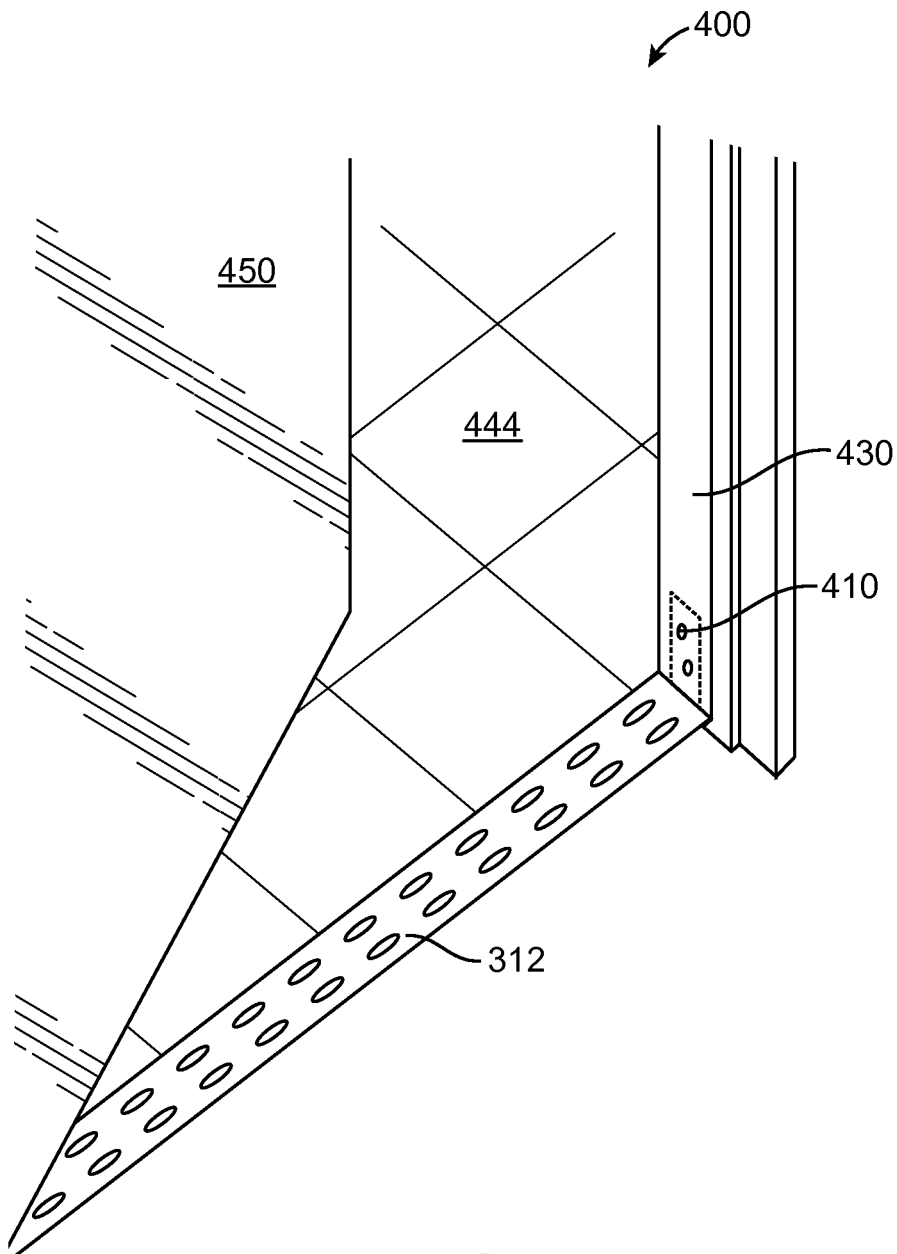
FIG. 32 is a perspective view of a combination elongated shower drain assembly and shower door frame according to an embodiment.

FIG. 32 illustrates an elongated shower drain assembly and door combination 400 installed in a shower wherein the drain grate 312 basically comprises a bottom side of the shower door frame and is substantially aligned with the shower floor 444. As noted previously, the drain grate 312 (or the V-shaped drain grate 412) is typically located directly above the door 450 when the door is closed. Finally, it is also to be appreciated that the base unit 302 of the elongated shower drain assembly can be coupled to the shower door frame 430 at any suitable time during the fabrication of the associated shower. For instance, the base unit 302 and the shower door frame 430 can be joined prior to their respective installation or, alternatively, they can be joined later such as after the elongated shower drain assembly drain has been installed in the shower floor 444.

It t is to be appreciated that the elongated shower drain assembly and door combination 400 can be installed in a manner similar to the methodology describe with respect to the first, second, or third embodiment elongated shower drain assemblies. A significant difference between this combination 400 and other implementations is that a door frame is installed contemporaneously with the elongated shower drain assembly. In some methods, the elongated shower drain assembly can be first installed in the subfloor and hooked up to the plumbing as necessary and then a three-sided door frame can be secured in place using the vertically extending flanges 410 and associated fasteners or other fastening means. In other methods, the shower door frame 430 can be secured to the base unit 302 before installation of either in the shower and as such the elongated shower drain assembly and shower door frame combination 400 is installed as a single unit. Typically, the shower pan (as applicable) and tilework comprising the shower floor 444 is completed after the installation of the elongated shower drain assembly and shower door frame combination 400.

Advantages of the elongated shower drain assembly and shower door frame combination 400 are numerous: (i) the shower designer no longer has to be concerned with water leaking out of the shower at the base of the door; (ii) the step over ledge typically created with standard shower frame doors that have a bottom horizontal leg is eliminated; and the aesthetics over standard shower doors is improved. Further, the shower drain which is typically comprised of a high strength material provides the rigidity and structural integrity usually provided by the bottom horizontal leg of a traditional shower drain floor.

Alternative Embodiments and Variations

The various preferred embodiments and variations thereof illustrated in the accompanying figures and/or described above are merely exemplary and are not meant to limit the scope of the invention. It is to be appreciated that numerous variations to the invention have been contemplated as would be obvious to one of ordinary skill in the art with the benefit of this disclosure. All variations of the invention that read upon the appended claims are intended and contemplated to be within the scope of the invention.

The installation of the elongated drain assembly embodiments are described above for plywood or OSB type subfloors. It is appreciated, however, that the drain assemblies can be used with concrete floors as well with suitable modification of the above described processes. For instance, for poured concrete installations, the second embodiment drain is coupled to the drain pipe and supported in place with an appropriate form. The concrete is then poured around the drain securing it in place. The membrane flange is then unfolded and affixed to the concrete floor and the subsequently laid waterproof membrane in a manner similar to that described above.

I claim:

1. An elongated shower drain assembly comprising:
  a base unit, the base unit comprising a flange section, the flange section substantially surrounding a trough section, the trough section including a bottom side and at least one discharge opening, the at least one discharge opening of the trough section being operatively coupled to at least one drain pipe connector, and one or more cross members extending across the width of the trough section;
  a drain grate cover, the drain grate cover having a perforated top surface;
  one or more spacers, the one or more spacers adapted to couple the drain grate cover to the base unit; and
  a waterproof membrane flange, the waterproof membrane flange being coupled to flange section of the base unit and having a waterproof membrane opening generally corresponding to a size of a trough opening of the trough section.

2. The drain assembly of claim 1, wherein the at least one discharge opening comprises a center discharge opening located generally proximate the longitudinal middle of the trough section, and the bottom side includes a left portion sloping downwardly towards the center discharge opening and a right portion sloping downwardly towards the center discharge opening.

3. The drain assembly of claim 2, wherein the at least one discharge opening further comprises a left discharge opening disposed on the left portion of the bottom side of the trough section and a right discharge opening disposed on the right portion of the bottom side of the trough section.

4. The drain assembly of claim 1, wherein the drain grate cover is a drain grate comprising a U-shaped channel along each longitudinal edge.

5. The drain assembly of claim 4, wherein the one or more cross members include at least one aperture and each of the one or more spacers include a set of legs adapted to engage with the one or more cross members, one or more holes substantially aligned with a one of the at least one aperture when placed over the one or more cross member, a plurality of slots adapted to slidably couple with the U-shaped channels of the drain grate, and a fastener extending through the one or more holes to the at least one aperture and adapted to couple the one or more spacers to the one or more cross members.

6. The drain assembly of claim 1, wherein the drain grate cover is a V-shaped drain grate comprising a V-shaped channel having an inwardly angled lip along each longitudinal edge.

7. The drain assembly of claim 6, wherein an angle of the inwardly angled lip is approximately 60 degrees.

8. The drain assembly of claim 6, wherein the one or more cross members include at least one aperture and each of the one or more spacers include a set of legs adapted to engage with the one or more cross members, one or more extended holes substantially aligned with a one of the at least one aperture when placed over the one or more cross member, a plurality of slots adapted to slidably couple with the V-shaped channels of the V-shaped drain grate, and a fastener extending through the one or more holes to the at least one aperture and adapted to couple the one or more spacers to the one or more cross members.

9. The drain assembly of claim 6, wherein the one or more spacers comprise one or more adjustable spacers, each of the one or more adjustable spacers comprising a first body member and a second body member,
(i) the first body member including a set of legs adapted to engage around the one or more cross members, a pair of clasp legs adapted to securely engage the one or more cross members, a first body hole disposed along a generally flat top portion in the approximate center thereof, and
(ii) the second body member including a pair of legs adapted to extend over top of the first body member, an extended hole substantially aligned with the first body hole, one or more adjustment holes aligned over the generally flat top portion of the first body member, and plurality of slots adapted to slidably couple with the V-shaped channels of the V-shaped drain grate, and
(iii) a fastener extending through the extended hole and adapted to couple the first and second body members together, and
(iv) one or more adjustment fasteners extending through the one or more adjustment holes having an end in contact with the generally flat top portion of the first body member and adapted to adjust a distance between the first and second body members.

10. The drain assembly of claim 6, wherein an angle of the inwardly angled lip is approximately 60 degrees.

11. The drain assembly of claim 1, wherein the at least one discharge opening comprises a center discharge opening located generally proximate the longitudinal middle of the trough section, and the bottom side includes a left portion sloping downwardly towards the center discharge opening and a right portion sloping downwardly towards the center discharge opening.

12. The drain assembly of claim 1, wherein the drain grate cover is a V-shaped drain grate comprising a V-shaped channel having an inwardly angled lip along each longitudinal edge.

13. A method of adjusting the placement of a V-shaped drain grate, the method comprising:
providing an elongated shower drain assembly, the elongated drain assembly comprising,
a base unit, the base unit comprising a flange section, the flange section substantially surrounding a trough section, the trough section including a bottom side and at least one discharge opening, the at least one discharge opening of the trough section being operatively coupled to at least one drain pipe connector, and one or more cross members extending across the width of the trough section,
a drain grate cover, the drain grate cover having a perforated top surface, wherein the drain grate cover is a V-shaped drain grate comprising a V-shaped channel having an inwardly angled lip along each longitudinal edge,
one or more adjustable spacers, the one or more spacers adapted to couple the drain grate cover to the base unit, each of the one or more adjustable spacers comprising a first body member and a second body member,
(i) the first body member including a set of legs adapted to engage around the one or more cross members, a pair of clasp legs adapted to securely engage the one or more cross members, a first body hole disposed along a generally flat top portion in the approximate center thereof, and
(ii) the second body member including a pair of legs adapted to extend over top of the first body member, an extended hole substantially aligned with the first body hole, one or more adjustment holes aligned over the generally flat top portion of the first body member, and plurality of slots adapted to slidably couple with the V-shaped channels of the V-shaped drain grate, and
(iii) a fastener extending through the extended hole and adapted to couple the first and second body members together, and
(iv) one or more adjustment fasteners extending through the one or more adjustment holes having an end in contact with the generally flat top portion of the first body member and adapted to adjust a distance between the first and second body members; and
a waterproof membrane flange, the waterproof membrane flange being coupled to flange section of the base unit and having a waterproof membrane opening generally corresponding to a size of a trough opening of the trough section,
adjusting a horizontal position of the V-shaped drain grate in relation to the base unit by sliding the second body portion along the first body member a distance allowed by the extended hole and the fastener therein; and adjusting a vertical position of the V-shaped drain grate in relation to the base unit by rotating the one or more adjustment fasteners whereby the end remains in contact with the generally flat top portion of the first body member.

14. The method of claim 13 further comprising, adjusting a plane of the horizontal position of the V-shaped drain grate in relation to the base unit by rotating a one of the one or more adjustment fasteners a different amount then another of the one or more adjustment fasteners whereby each end remains in contact with the generally flat top portion of the first body member.

15. An elongated shower drain assembly comprising:

a base unit, the base unit comprising a flange section, the flange section substantially surrounding a trough section, the trough section including a bottom side and at least one discharge opening, the at least one discharge opening of the trough section being operatively coupled to at least one drain pipe connector;

a drain grate cover, the drain grate cover having a perforated top surface;

one or more spacers, the one or more spacer adapted to couple the drain grate cover to the base unit; and a waterproof membrane flange, the waterproof membrane flange being coupled to flange section of the base unit and having a waterproof membrane opening generally corresponding to a size of a trough opening of the trough section.

* * * * *